United States Patent
Nagayama

(10) Patent No.: US 10,657,417 B2
(45) Date of Patent: May 19, 2020

(54) PERSON INFORMATION DISPLAY APPARATUS, A PERSON INFORMATION DISPLAY METHOD, AND A PERSON INFORMATION DISPLAY PROGRAM

(71) Applicant: AMBASS INC., Tokyo (JP)

(72) Inventor: Hiroshi Nagayama, Tokyo (JP)

(73) Assignee: AMBASS INC., Tokyo (JP)

(*) Notice: Subject to any disclaimer, the term of this patent is extended or adjusted under 35 U.S.C. 154(b) by 216 days.

(21) Appl. No.: 16/062,691

(22) PCT Filed: Dec. 1, 2017

(86) PCT No.: PCT/JP2017/043270
§ 371 (c)(1),
(2) Date: Jun. 15, 2018

(87) PCT Pub. No.: WO2018/123440
PCT Pub. Date: Jul. 5, 2018

(65) Prior Publication Data
US 2019/0236408 A1    Aug. 1, 2019

(30) Foreign Application Priority Data
Dec. 28, 2016 (JP) .................... 2016-255739

(51) Int. Cl.
*G06K 9/62* (2006.01)
*H04N 5/765* (2006.01)
(Continued)

(52) U.S. Cl.
CPC ......... *G06K 9/6247* (2013.01); *G06F 3/0482* (2013.01); *G06F 16/00* (2019.01);
(Continued)

(58) Field of Classification Search
CPC .. G06K 9/6247; G06K 9/6263; G06F 16/745; G06F 16/7834; G06F 16/00; G06F 16/61;
(Continued)

(56) References Cited

U.S. PATENT DOCUMENTS

2008/0247610 A1    10/2008  Tsunoda
2009/0074304 A1*    3/2009  Momosaki ......... G06K 9/00268
                                                    382/224
(Continued)

FOREIGN PATENT DOCUMENTS

JP    2008-257460 A    10/2008
JP    2009-232250 A    10/2009
(Continued)

OTHER PUBLICATIONS

Feb. 20, 2018 International Search Report issued in International Patent Application No. PCT/JP2017/043270.

*Primary Examiner* — Ali Bayat
(74) *Attorney, Agent, or Firm* — Oliff PLC

(57) ABSTRACT

The invention includes: a characteristic extraction unit for extracting facial characteristics of persons from moving image data; correspondence information extraction unit for extracting characteristic information corresponding to facial characteristics extracted by characteristic extraction unit from pre-stored characteristic information on faces of multiple persons; exclusion candidate setting unit for setting, to an exclusion candidate, characteristic information selected in accordance with an input of a user or a predetermined criterion among analogous characteristic information if multiple characteristic information extracted by the correspondence information extraction unit is analogous; and a person information output unit for displaying, on a display unit, information indicating a person corresponding to characteristic information extracted by the correspondence information extraction unit and set to the exclusion candidate by the
(Continued)

exclusion candidate setting unit, as well as information indicating a person corresponding to the characteristic information extracted by the correspondence information extraction unit and not set to the exclusion candidate.

17 Claims, 10 Drawing Sheets

(51) Int. Cl.
| | |
|---|---|
| *H04N 21/44* | (2011.01) |
| *H04N 21/4722* | (2011.01) |
| *G06F 16/00* | (2019.01) |
| *H04N 21/432* | (2011.01) |
| *H04N 5/76* | (2006.01) |
| *H04N 5/93* | (2006.01) |
| *G06F 3/0482* | (2013.01) |
| *G06K 9/00* | (2006.01) |

(52) U.S. Cl.
CPC ....... *G06K 9/00288* (2013.01); *G06K 9/6263* (2013.01); *H04N 5/76* (2013.01); *H04N 5/765* (2013.01); *H04N 5/93* (2013.01); *H04N 21/432* (2013.01); *H04N 21/44* (2013.01); *H04N 21/4722* (2013.01)

(58) Field of Classification Search
CPC ....... G06F 16/685; G06F 3/0482; H04N 5/76; H04N 5/765; H04N 5/93; H04N 21/432; H04N 21/44; H04N 21/4722
USPC ........................................................ 382/118
See application file for complete search history.

(56) References Cited

U.S. PATENT DOCUMENTS

| | | | |
|---|---|---|---|
| 2009/0089056 A1* | 4/2009 | Fujii | G10L 17/005 704/246 |
| 2009/0089837 A1* | 4/2009 | Momosaki | G11B 27/034 725/40 |
| 2010/0104144 A1 | 4/2010 | Momosaki et al. | |
| 2011/0096135 A1 | 4/2011 | Hegde et al. | |
| 2013/0198766 A1 | 8/2013 | Yoon et al. | |
| 2015/0373404 A1 | 12/2015 | Fukazawa et al. | |
| 2017/0286754 A1* | 10/2017 | Eder | G06T 7/50 |
| 2018/0173980 A1* | 6/2018 | Fan | G06K 9/00906 |
| 2019/0272413 A1* | 9/2019 | Eder | H04N 5/23293 |

FOREIGN PATENT DOCUMENTS

| | | |
|---|---|---|
| JP | 2010-103764 A | 5/2010 |
| JP | 2010-239507 A | 10/2010 |
| JP | 2010-257449 A | 11/2010 |
| JP | 2011-039797 A | 2/2011 |
| JP | 2012-123676 A | 6/2012 |
| JP | 2013-509094 A | 3/2013 |
| JP | 2013-157984 A | 8/2013 |
| JP | 2014-086926 A | 5/2014 |
| JP | 2014-139733 A | 7/2014 |
| JP | 2014-238712 A | 12/2014 |

* cited by examiner

FIG.2

| Personal ID | Characteristic information on the face (face image) | Full name | Series exclusion candidate | Single exclusion candidate | Exclusion determination Only the specific series is the application object | Whether the face image can be disclosed | Image for disclosure | Other information for disclosure |
|---|---|---|---|---|---|---|---|---|
| 000001 | 👤 | ○○ ○○ | | | | Possible | | ××× × |
| 000002 | 👤 | ○○ ○○ | | | ✓ | Impossible | 👤 | ××× × |
| 000003 | 👤 | ○○ ○○ | | ✓ | | Possible | | ××× × |
| 000004 | 👤 | ○○ ○○ | | | | Possible | | ××× × |
| ... | ... | ... | ... | ... | ... | ... | ... | ... |

| Personal ID | Personal ID of analogous persons |
|---|---|
| 000001 | 000064, 139167, 233891 |
| 000002 | |
| 000003 | 095075, 268311, 587695, 888239 |
| 000004 | 605496 |
| . | . |

| Drama "xxxxx" | | | | |
|---|---|---|---|---|
| First story | Second story | Third story | Fourth story | Fifth story |

FIG.5

| | | | | |
|---|---|---|---|---|
| 138716 ○○ ○○ | 070417 ○○ ○○ | 000004 ○○ ○○ | 139167 ○○ ○○ | 000001 ○○ ○○ |
| Set to the series exclusion candidate  62a ☐ | Set to the series exclusion candidate  62a ☐ | Exclusion determination  72 ☐ | Set to the series exclusion candidate  62a ☐ | Exclusion determination  72 ☐ |
| Set to the single exclusion candidate  62b ☐ | Set to the single exclusion candidate  62b ☐ | Release the exclusion candidate  73 ☐ | Set to the single exclusion candidate  62b ☐ | Release the exclusion candidate  73 ☐ |
| [Casting time] 74 minutes [Casting time point] · minutes, seconds to minutes, seconds, · minutes, seconds to minutes, seconds, · hours, minutes, seconds to hours, minutes, seconds | [Casting time] 61 minutes [Casting time point] · hours, minutes, seconds to hours, minutes, seconds · hours, minutes, seconds to hours, minutes, seconds | [Casting time] 52 minutes [Casting time point] · minutes, seconds to minutes, seconds, · minutes, seconds to minutes, seconds | [Casting time] 50 minutes [Casting time point] · minutes, seconds to minutes, seconds, · hours, minutes, seconds to hours, minutes, seconds | [Casting time] 10 minutes [Casting time point] · minutes, seconds to minutes, seconds, · minutes, seconds to minutes, seconds |

PERSON INFORMATION DISPLAY APPARATUS, A PERSON INFORMATION DISPLAY METHOD, AND A PERSON INFORMATION DISPLAY PROGRAM

TECHNICAL FIELD

The present invention relates to a person information display apparatus, a person information display method, and a person information display program. The present invention more specifically relates to an apparatus, method, and program for displaying information indicating a person displayed in moving images.

BACKGROUND ART

Conventionally, an apparatus for extracting a subject from moving image data is known (for example, Patent Document 1). In accordance with diversification of work styles and lifestyles, VOD (Video On Demand) mainly including the Internet has recently garnered attention. For example, as VOD of TV programs, IP simultaneous broadcasting and overlooked programs are provided. The contents of such VOD are different from conventional TV programs broadcast at a fixed time and positively selected by users and thereby viewed. Therefore, in order to attract the attention of more users, a variety of program information needs be provided for each content. Cast information is one piece of information that users particularly wish to know among the program information.

Therefore, in order to provide cast information as program information, an operation is carried out in which information on those cast for each content of VOD is associated with each content and created.

PRIOR ART DOCUMENTS

Patent Document

[Patent Document 1] JP 2011-39797 A

SUMMARY OF THE INVENTION

Problems to be Solved by the Invention

Unfortunately, cast information on each content may not be provided from a program production company, etc. in advance. Moreover, even if provided, the information may be erroneous. Therefore, in order to associate the cast information with each content, the subject of each content must be confirmed to specify the cast, which must be registered as program information. Unfortunately, if this operation is carried out by human management, it takes a very long time. Moreover, in VOD which may limit the disclosure period, moving images prior to determining the disclosure may also be subjected to the operation of specifying and registering the cast in advance, because the operation may not be in time after determining the disclosure. In this case, if the moving images are not disclosed, the operation will be wasteful. Therefore, in order to eliminate this waste, the operation time must be shortened such that the operation is in time even after determining the disclosure.

Moreover, it is assumed that the cast information is generally disclosed with the contents. Therefore, accurate information must be provided so as not to give rise to errors in disclosed information.

In view of the foregoing, the object of the present invention is to provide a person information display apparatus, etc. for faster and more accurately providing information indicating a person displayed in moving images.

Means for Solving the Problems

The person information display apparatus disclosed in the present application includes: a characteristic extraction unit for extracting facial characteristics of persons from moving image data; a correspondence information extraction unit for extracting characteristic information corresponding to the facial characteristics extracted by the characteristic extraction unit from pre-stored characteristic information on faces of multiple persons; an exclusion candidate setting unit for setting, to an exclusion candidate, the characteristic information selected in accordance with an input of a user or a predetermined criterion among analogous characteristic information if multiple characteristic information extracted by the correspondence information extraction unit is analogous; and a person information output unit for displaying, on a display unit, information indicating a person corresponding to the characteristic information extracted by the correspondence information extraction unit and set to the exclusion candidate by the exclusion candidate setting unit, as well as information indicating a person corresponding to the characteristic information extracted by the correspondence information extraction unit and not set to the exclusion candidate.

Effects of the Invention

One perspective of the present application allows the faster and more accurate provision of information indicating a person displayed in moving images.

BRIEF DESCRIPTION OF THE DRAWINGS

FIG. 2 is a data configuration diagram of a moving image storage unit, person information storage unit, and analogous relationship storage unit according to Embodiment 1.

FIG. 5 is an explanatory view illustrating one example of the display mode of a cast checklist in Embodiment 1.

MODE FOR CARRYING OUT THE INVENTION

Embodiment 1

Hereinafter, embodiments of the present invention will be described with reference to the appended figures.

Figure 1:
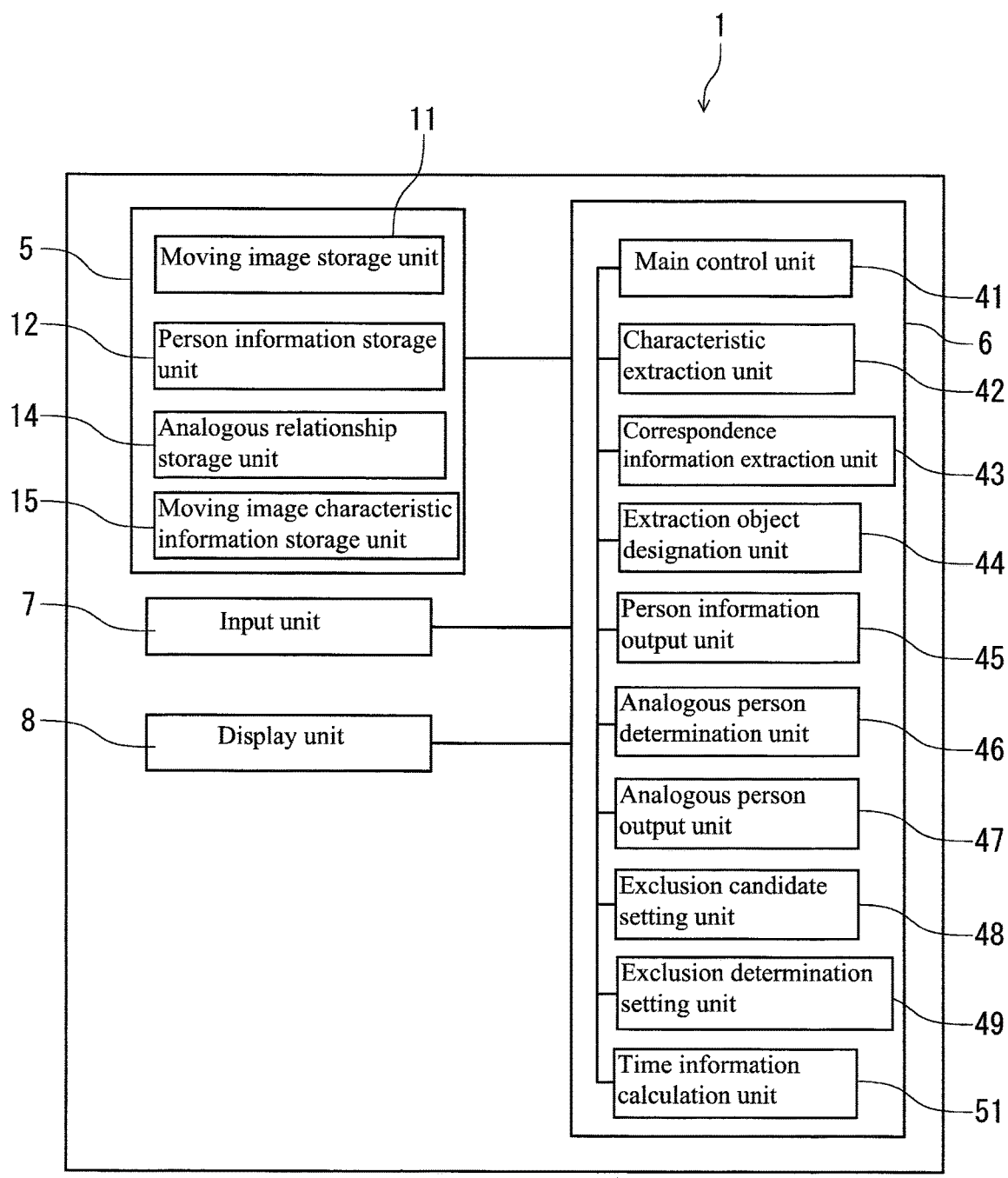
FIG. 1 is a functional block diagram of a person information display apparatus according to Embodiment 1.

FIG. 1 is a functional block diagram of person information display apparatus 1 according to Embodiment 1. Person information display apparatus 1, for example, is achieved by a computer such as a PC. Person information display apparatus 1 includes storage unit 5 for storing various information, control unit 6 for controlling the overall apparatus, input unit 7 for accepting external input via an input means, and display unit 8 for displaying various information.

Storage unit 5, for example, is achieved by a storage means such as a hard disk, main memory, flash memory, or other various memory, so as to store various programs, various data, etc.

Storage unit 5 includes: moving image storage unit 11 for storing moving image data; person information storage unit 12 for storing characteristic information on the faces of persons; analogous relationship storage unit 14 for storing analogous relationship information indicating analogous persons; and moving image characteristic information storage unit 15 for storing the facial characteristics extracted from the moving image data.

As illustrated in FIG. 2, moving image storage unit 11, for example, pre-stores moving image data 17 of a series of moving images provided by VOD. In the present embodiment, moving image data 17 of a drama specified by the title "xxxxx" and consisting of five stories is stored. That is, each moving image of one to five stories configuring the drama is a moving image configuring the same series. Here, for descriptive purposes, multiple moving image data 17 configuring the same series are referred to as moving image data 17a for series-configuring moving images. As illustrated in FIG. 2, moving image data 17 includes multiple moving image data 17a for series-configuring moving images, with moving image storage unit 11 storing multiple moving image data 17a for series-configuring moving images.

Moreover, person information storage unit 12 pre-stores person information 20 including characteristic information 21 of the faces of persons, etc. In the present embodiment, face images are pre-stored as characteristic information 21. The face images, for example, are assumed to be photographs of faces or static images of faces. Moreover, personal ID 22 for identifying each characteristic information 21 is assigned to each characteristic information 21. In the present embodiment, while personal ID 22 is configured by numbers, it may be configured by characters, symbols, combinations thereof with numbers, etc. Person information 20 includes personal ID 22 as well as full name 23 of the person indicated by characteristic information 21. Moreover, person information 20 has exclusion candidate information 25 indicating whether characteristic information 21 is set to an exclusion candidate. The exclusion candidate is a candidate of a person excluded from the cast information. Moreover, the cast information is information regarding the persons displayed in moving image data 17. In the present embodiment, cast information is information regarding persons cast in moving image data 17, as well as information on those cast disclosed so as to be associated with each moving image, as mentioned below.

In the present embodiment, as the type of exclusion candidate, series exclusion candidate 25a and single exclusion candidate 25b are provided.

Series exclusion candidate 25a is a candidate of a person excluded from the cast information in all moving image data 17a for series-configuring moving images configuring the same series.

Characteristic information 21 set to series exclusion candidate 25a in at least one of multiple moving image data 17a for series-configuring moving images configuring the same series is excluded from characteristic information 21 extracted by the below-mentioned correspondence information extraction unit 43, in the process in which other moving image data 17a for series-configuring moving images configuring the same series serve as the object.

For example, characteristic information 21 set to series exclusion candidate 25a in the process of the abovementioned first-story moving image data 17a for series-configuring moving images is excluded from characteristic information 21 extracted by the below-mentioned correspondence information extraction unit 43, in the process of other second to fifth-story moving image data 17a for series-configuring moving images.

Moreover, single exclusion candidate 25b is a candidate of a person excluded from the cast information only regarding one moving image data 17a for series-configuring moving images. Single exclusion candidate 25b is a setting used for cases in which, for example, characteristic information 21 is set to an exclusion candidate only regarding the abovementioned first-story moving image data 17a for series-configuring moving images, while those of the other second to fifth stories are not set to the exclusion candidate. Note that single exclusion candidate 25b may be set so as to be automatically released upon completion of the below-mentioned process regarding moving image data 17a for series-configuring moving images serving as the object, or may be set such that an exclusion candidate setting regarding which of moving image data 17a for series-configuring moving images can be identified by the below-mentioned exclusion candidate setting unit 48.

In FIG. 2, for descriptive purposes, setting to the exclusion candidate is indicated by a check mark. A person to which the check mark is assigned is an exclusion candidate. In the example of FIG. 2, characteristic information 21 of personal ID 22 "000004" is set to single exclusion candidate 25b. Note that in the example of FIG. 2, the setting state indicated by the check mark is a setting applied to moving image data 17 of the current process object. Therefore, for example, if the setting state illustrated in FIG. 2 is used upon processing the abovementioned first-story moving image data 17a for series-configuring moving images, characteristic information 21 of personal ID 22 "000004" is set to the exclusion candidate regarding the abovementioned first-story moving image data 17a for series-configuring moving images.

Moreover, person information 20 includes exclusion determination information 26. Exclusion determination information 26 is information indicating a person who has been determined to be excluded from the cast information. As mentioned below, the user determines whether a person set as an exclusion candidate is excluded from the cast information and the input of exclusion determination information 26 by the user stores exclusion determination information 26 in person information storage unit 12.

Further, person information 20 stores application scope information 28 indicating the application scope of characteristic information 21. In the present embodiment, application scope information 28 is information indicating whether characteristic information 21 can only be used for the specific series or all moving image data 17. Note that "can be used" means an extraction object of the below-mentioned correspondence information extraction unit 43.

In the example of FIG. 2, for descriptive purposes, it is indicated by the check mark that characteristic information 21 can only be used for the specific series. Characteristic information 21 to which the check mark is not assigned can be used for all moving image data 17.

In the example of FIG. 2, characteristic information 21 of personal ID 22 "000002" is set such that it can only be used for the specific series. As mentioned above, in the example of FIG. 2, the setting state indicated by the check mark is a setting applied to moving image data 17 of the current process object. Therefore, if the setting state illustrated in FIG. 2 is used upon processing the abovementioned first-story moving image data 17a for series-configuring moving images, the abovementioned specific series is the drama"xxxxx" configured by the abovementioned first to fifth-story moving image data 17a for series-configuring moving images.

Consequently, in the example of FIG. 2, characteristic information 21 of personal ID 22 "000002" serves as the extraction object of the below-mentioned correspondence information extraction unit 43 in the process of the abovementioned first to fifth-story moving image data 17a for series-configuring moving images, but in contrast, is excluded from the extraction object of correspondence information extraction unit 43 in the process of other moving image data 17.

Note that upon completion of the below-mentioned process regarding all moving image data 17a for series-configuring moving images configuring the specific series serving as the object, application scope information 28 may be set such that characteristic information 21 is automatically excluded from the extraction object of the below-mentioned correspondence information extraction unit 43 in the process of other moving image data 17, or may be set such that which series serves as the application object can be identified by the below-mentioned extraction object designation unit 44.

In addition, person information 20 stores: face images disclosure permission information 31 indicating whether the face images can be disclosed; image 32 for disclosure; and other information 33 for disclosure. Face image disclosure permission information 31 is information indicating whether the face image used as characteristic information 21 may be a disclosed image. Image 32 for disclosure is disclosed upon disclosing the cast information. In the present embodiment, image 32 for disclosure is disclosed as the image of a person indicated by characteristic information 21 if the face image used as characteristic information 21 cannot be disclosed by face image disclosure permission information 31. Image 32 for disclosure may be a image displaying, for example, an illustration or a silhouette image of a person. Other information 33 for disclosure, for example, is disclosed as the cast information such as a profile and other cast programs of a person.

Characteristic information 21, full name 23, exclusion candidate information 25, exclusion determination information 26, application scope information 28, face image disclosure permission information 31, image 32 for disclosure, and other information 33 for disclosure are all associated with personal ID 22.

Analogous relationship storage unit 14 pre-stores analogous relationship information 36 indicating which characteristic information 21 is analogous to which characteristic information 21. Analogous relationship information 36 includes personal ID 22 as well as personal ID 37 of analogous persons associated with personal ID 22. Analogous persons are persons with analogous characteristic information 21. That is, persons with analogous facial characteristics are analogous persons, with personal ID 22 stored as analogous relationship information 36. As mentioned above, personal ID 22 identifies each characteristic information 21 and is assigned to each characteristic information 21.

In the example illustrated in FIG. 2, characteristic information 21 analogous to characteristic information 21 identified by personal ID 22 "000001" is characteristic information 21 identified by personal IDs 22 "000064," "139167," and "233891." Therefore, the person identified by personal ID 22 "000001" is analogous to each person identified by each of personal ID 22 "000064," "139167," and "233891."

Moreover, in the example of FIG. 2, because there is no personal ID 37 of analogous persons associated with personal ID 22 "000002," there is no characteristic information 21 analogous to characteristic information 21 identified by personal ID 22 "000002" in person information 20.

In the present embodiment, the mutually analogous relationship regarding characteristic information 21 recorded in person information 20 is pre-determined and stored as analogous relationship information 36 in analogous relationship storage unit 14. The analogous relationship of characteristic information 21 is determined, for example, by image matching using information of the characteristic points of the image. Control unit 6 extracts the characteristic points from multiple face images stored as characteristic information 21, compares the extracted characteristic points, and determines which face images are analogous to which face images in accordance with the threshold of pre-set similarities. As one example, the characteristic points are extracted among the points having a strong gradation change in face images, indicating the position and shape of each part such as eyes, noses, and lips. Note that upon determining the analogous relationship of characteristic information 21, any image matching determination process may be executed. For example, by utilizing an existing image process library such as OpenCV, the analogous relationship of each face image may be determined.

Note that analogous relationship information 36 may be pre-created using another computer and pre-stored in analogous relationship storage unit 14.

Note that as mentioned above, personal ID 22 of characteristic information 21 which has been determined to be analogous by image matching may be stored as analogous relationship information 36, or personal ID 22 of characteristic information 21 which has been determined to be analogous by methods other than image matching may be stored as analogous relationship information 36.

Moreover, the analogous relationship of characteristic information 21 of persons which have been determined to be analogous by the user may be stored in analogous relationship information 36. For example, characteristic information 21 of an impersonator and characteristic information 21 of the person copied by the impersonator may be stored as mutually analogous information in analogous relationship information 36.

Moreover, for example, as mentioned below, when multiple characteristic information 21 per one person is stored, this characteristic information 21 may be stored as mutually analogous information in analogous relationship information 36.

Moving image characteristic information storage unit 15 stores the facial characteristics of persons extracted from moving image data 17 by the below-mentioned characteristic extraction unit 42. Here, for descriptive purposes, the facial characteristics of persons extracted from moving image data 17 are referred to as moving image characteristic information.

Control unit 6 (FIG. 1), for example, is achieved by a computing means such as a processor or CPU and cooperates with a storage means such as various memory or hard disks, functions, and executes various programs.

Control unit 6 includes: main control unit 41; characteristic extraction unit 42 for extracting the facial characteristics of persons from moving image data 17; correspondence information extraction unit 43 for extracting characteristic information 21 corresponding to the facial characteristics; extraction object designation unit 44 for designating the application scope of characteristic information 21; and person information output unit 45 for displaying, on display unit 8, information indicating persons corresponding to characteristic information 21.

Moreover, control unit 6 includes: analogous person determination unit 46 for determining whether multiple characteristic information 21 is analogous; analogous person output unit 47 for displaying the below-mentioned analogous person information 60 on display unit 8; exclusion candidate setting unit 48 for setting characteristic information 21 to the exclusion candidate; exclusion determination setting unit 49 for determining the exclusion; and time information calculation unit 51 for calculating information regarding time.

Main control unit 41 executes various programs and controls among various configuration units and each function unit, in addition to controlling the overall apparatus.

Characteristic extraction unit 42 specifies the image part of the faces of persons from moving image data 17 and extracts the facial characteristics (the abovementioned moving image characteristic information) displayed in moving image data 17. In the present embodiment, characteristic extraction unit 42 extracts information on the characteristic points of the faces as the moving image characteristic information from moving image data 17. Note that in order to extract the facial characteristics from moving image data 17, any face recognition algorithm may be used. For example, as mentioned above, an existing image process library such as OpenCV may be by utilized.

Correspondence information extraction unit 43 extracts characteristic information 21 corresponding to the moving image characteristic information extracted by characteristic extraction unit 42 from pre-stored characteristic information 21 on the faces of multiple persons. Note that correspondence here includes an acceptable error range. Moreover, similarity within a predetermined threshold may be regarded as correspondence.

In the present embodiment, correspondence information extraction unit 43 extracts characteristic information 21 corresponding to the abovementioned moving image characteristic information from characteristic information 21 stored in person information storage unit 12. Correspondence characteristic information 21 is extracted, for example, by image matching using information of the characteristic points of the image. Correspondence information extraction unit 43 extracts the characteristic points of the faces from face images stored as characteristic information 21, compares the extracted characteristic points with the characteristic points indicated by the abovementioned moving image characteristic information, and thereby extracts characteristic information 21 corresponding to the facial characteristics extracted from moving image data 17.

Note that as in the abovementioned image matching, any image matching determination process may be executed; alternatively, any existing image process library may be utilized.

Extraction object designation unit 44 designates characteristic information 21 serving as an extraction object regarding multiple moving image data 17 configuring the specific series. For example, extraction object designation unit 44 designates characteristic information 21 selected in accordance with the input of the user, as characteristic information 21 serving as the extraction object only in moving image data 17 of the specific series. Moreover, extraction object designation unit 44 stores application scope information 28 indicating the designation in person information storage unit 12.

In FIG. 2, for descriptive purposes, the designation as characteristic information 21 serving as the extraction object only in moving image data 17 of the specific series is indicated by the check mark. In the example of FIG. 2, as mentioned above, characteristic information 21 of personal ID 22 "000002" to which the check mark is assigned in application scope information 28 is characteristic information 21 serving as the extraction object of correspondence information extraction unit 43 only in moving image data 17 of the specific series.

Person information output unit 45 displays, on display unit 8, information indicating the person corresponding to characteristic information 21 extracted by correspondence information extraction unit 43. Moreover, person information output unit 45 displays, on display unit 8, information indicating the person corresponding to characteristic information 21 set as an exclusion candidate by exclusion candidate setting unit 48, as well as information indicating the person corresponding to characteristic information 21 not set as an exclusion candidate.

In the present embodiment, person information output unit 45 differentiates the display mode of the information indicating the person corresponding to characteristic information 21 set as an exclusion candidate by exclusion candidate setting unit 48, from the display mode of the information indicating the person corresponding to characteristic information 21 not set as an exclusion candidate, and displays it on display unit 8.

Analogous person determination unit 46 determines whether multiple characteristic information 21 extracted by correspondence information extraction unit 43 is analogous, based on analogous relationship information 36 indicating pre-stored analogous persons. In the present embodiment, analogous person determination unit 46 carries out the abovementioned determination based on analogous relationship information 36 stored in analogous relationship storage unit 14.

Moreover, analogous person determination unit 46 determines that multiple characteristic information 21 extracted by correspondence information extraction unit 43 is analogous if correspondence information extraction unit 43 extracts multiple characteristic information 21 as characteristic information 21 corresponding to one facial characteristic.

Analogous person output unit 47 displays, on display unit 8, information indicating a person corresponding to each of analogous multiple characteristic information 21 as analogous person information 60 if multiple characteristic information 21 extracted by correspondence information extraction unit 43 is analogous.

Exclusion candidate setting unit 48 sets characteristic information 21 selected in accordance with the input of the user or predetermined criterion to the exclusion candidate. Moreover, exclusion candidate setting unit 48 sets characteristic information 21 selected in accordance with the input of the user or the predetermined criterion to the exclusion candidate, among characteristic information 21 corresponding to analogous person information 60 displayed by analogous person output unit 47. Note that the abovementioned predetermined criterion is pre-set criterion.

Exclusion determination setting unit 49 sets the person selected in accordance with the input of the user to exclusion determination among the persons set as exclusion candidates. A person set to exclusion determination is excluded from the cast in information of the disclosed cast (hereinafter, referred to as "disclosed cast information"), and information indicating the person set to exclusion determination is not disclosed.

Time information calculation unit 51 calculates various time information such as the casting time of each person.

Input unit 7 inputs external data, etc. to person information display apparatus 1 using various input means such as a keyboard and mouse.

Display unit 8 includes display screen 8a such as a liquid crystal display or an organic EL display, and displays various moving images, image, data, information, etc. on the display screen.

Figure 3:
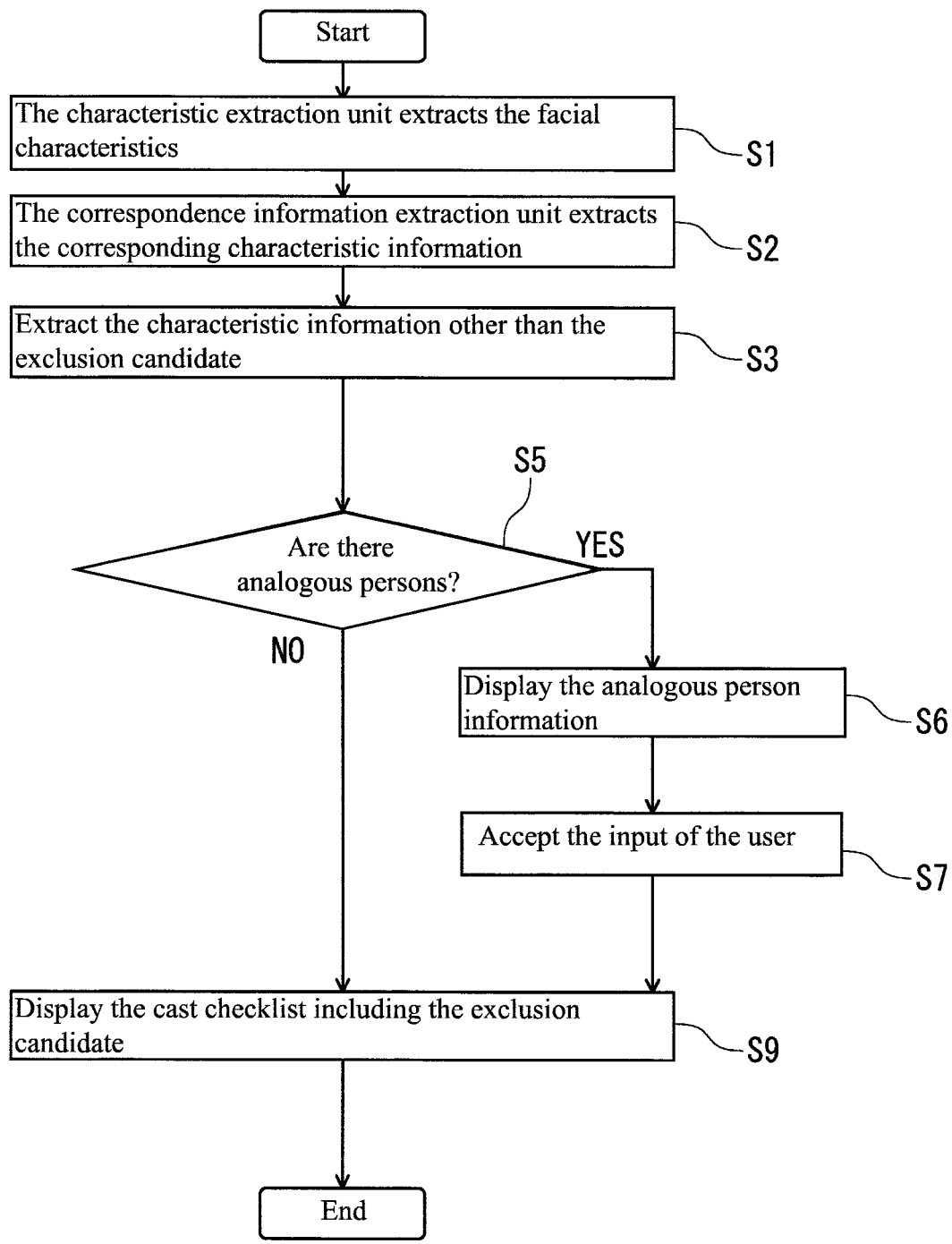
FIG. 3 is a flowchart illustrating the operation of a person information display apparatus according to Embodiment 1.

Next, the operation of person information display apparatus 1 will be described. A flowchart illustrating the flow of the process of person information display apparatus 1 is illustrated in FIG. 3.

First, characteristic extraction unit 42 extracts the facial characteristics from moving image data 17 (Step 1). In Step 1, characteristic extraction unit 42 reads moving image data 17 from moving image storage unit 11. In the present embodiment, if multiple moving image data 17 are stored in moving image storage unit 11, one of them is selected and read. That is, in the example illustrated in FIG. 2, one of the abovementioned first to fifth-story moving image data 17a for series-configuring moving images is read. Here, the case of reading the abovementioned first-story moving image data 17a for series-configuring moving images will be assumed and described.

In the present embodiment, characteristic extraction unit 42 extracts the facial characteristics from the key frame of moving image data 17a for series-configuring moving images. First, characteristic extraction unit 42 extracts multiple key frames from read moving image data 17a for series-configuring moving images. At this time, main control unit 41 specifies the key frame No. of each key frame. Note that the key frame No. corresponds to the reproduction time point.

Subsequently, characteristic extraction unit 42 specifies the image part of the faces of persons from each extracted key frame and extracts the facial characteristics (the abovementioned moving image characteristic information) displayed in moving image data 17. Here, as mentioned above, the characteristic points of the faces are extracted as the moving image characteristic information. Characteristic extraction unit 42 stores the extracted moving image characteristic information in moving image characteristic information storage unit 15. Moreover, characteristic extraction unit 42 stores, in moving image characteristic information storage unit 15, information for identifying which key frame each extracted moving image characteristic information is extracted from. For example, each moving image characteristic information is associated with the key frame No. of the key frames from which each moving image characteristic information is extracted, and characteristic extraction unit 42 stores each moving image characteristic information in moving image characteristic information storage unit 15.

Subsequently, correspondence information extraction unit 43 extracts characteristic information 21 corresponding to the moving image characteristic information extracted in Step 1 (Step 2). In Step 2, as mentioned above, correspondence characteristic information 21 is extracted, for example, by image matching using information of the characteristic points of the image. Correspondence information extraction unit 43 reads face images stored as characteristic information 21 from person information storage unit 12, and extracts the characteristic points of the faces from the read face images. Moreover, correspondence information extraction unit 43 reads the moving image characteristic information extracted from moving image characteristic information storage unit 15 by characteristic extraction unit 42. Subsequently, correspondence information extraction unit 43 compares the characteristic points extracted from the face images of characteristic information 21 with the characteristic points indicated by the abovementioned moving image characteristic information, thereby extracting characteristic information 21 corresponding to the facial characteristics extracted from moving image data 17a for series-configuring moving images.

Next, main control unit 41 extracts characteristic information 21 other than the exclusion candidate from characteristic information 21 extracted by correspondence information extraction unit 43 in Step 2 (Step 3). In the example of FIG. 2, characteristic information 21 of personal ID 22 "000004" is set to the exclusion candidate (in the example of FIG. 2, single exclusion candidate 25b). Therefore, if multiple characteristic information 21 extracted by correspondence information extraction unit 43 includes characteristic information 21 identified by personal ID 22 "000004," main control unit 41 extracts characteristic information 21 other than characteristic information 21 of personal ID 22 "000004."

Subsequently, analogous person determination unit 46 determines whether there are analogous persons in characteristic information 21 extracted in Step 3 (Step 5). In the present embodiment, two patterns to determine analogous persons are assumed. The first pattern is that analogous person determination unit 46 determines the analogous relationship using analogous relationship information 36 stored in analogous relationship storage unit 14.

In this case, analogous person determination unit 46 determines whether multiple characteristic information 21 extracted by correspondence information extraction unit 43 is analogous, based on analogous relationship information 36 indicating pre-stored analogous persons.

First, analogous person determination unit 46 reads analogous relationship information 36 from analogous relationship storage unit 14. Additionally, analogous person determination unit 46 determines whether there is mutually analogous characteristic information 21 in characteristic information 21 extracted in Step 3, based on read analogous relationship information 36.

In the example of FIG. 2, characteristic information 21 analogous to characteristic information 21 identified by personal ID 22 "000001" is characteristic information 21 identified by personal IDs 22 "000064," "139167," and "233891." For example, if characteristic information 21 extracted in Step 3 includes characteristic information 21 identified by personal ID 22 "000001," as well as characteristic information 21 identified by personal ID 22 "139167," analogous person determination unit 46 determines that characteristic information 21 of personal ID 22 "000001" is analogous to characteristic information 21 of personal ID 22 "139167," based on analogous relationship information 36. As a result, analogous person determination unit 46 determines that there are analogous persons in characteristic information 21 extracted in Step 3.

Moreover, the second pattern is that analogous person determination unit 46 determines the analogous relationship without using analogous relationship information 36.

In this second pattern, analogous person determination unit 46 determines that multiple characteristic information 21 extracted by correspondence information extraction unit 43 is analogous if correspondence information extraction unit 43 extracts multiple characteristic information 21 as characteristic information 21 corresponding to one facial characteristic (moving image characteristic information).

In this example, regarding the moving image characteristic information corresponding to characteristic information 21 extracted in Step 3, analogous person determination unit 46 determines whether correspondence information extraction unit 43 has extracted multiple characteristic information 21 corresponding to one piece of moving image characteristic information (the facial characteristic of one person) in Step 2. If it determines the extraction of multiple characteristic information 21, analogous person determination unit 46 determines that multiple characteristic information 21 is analogous.

This is because if multiple characteristic information 21 corresponds to the facial characteristic of one person, multiple characteristic information 21 is presumably determined to be mutually analogous so as to correspond to the facial characteristic of one person.

As mentioned above, in Step 1, characteristic extraction unit 42 extracts the facial characteristics from multiple key frames. Therefore, if characteristic extraction unit 42 extracts multiple characteristic information 21 regarding the extracted facial characteristic of one person in one key frame, analogous person determination unit 46 determines that multiple characteristic information 21 extracted by correspondence information extraction unit 43 is analogous.

If analogous person determination unit 46 determines that multiple extracted characteristic information 21 per one piece of moving image characteristic information is analogous, analogous person determination unit 46 determines that there are analogous persons in characteristic information 21 extracted in Step 3.

In Step 5, if analogous person determination unit 46 determines that there are analogous persons, analogous person output unit 47 displays, on display unit 8, information indicating a person (analogous person) corresponding to each of analogous multiple characteristic information 21 as analogous person information 60 (Step 6).

Figure 4:
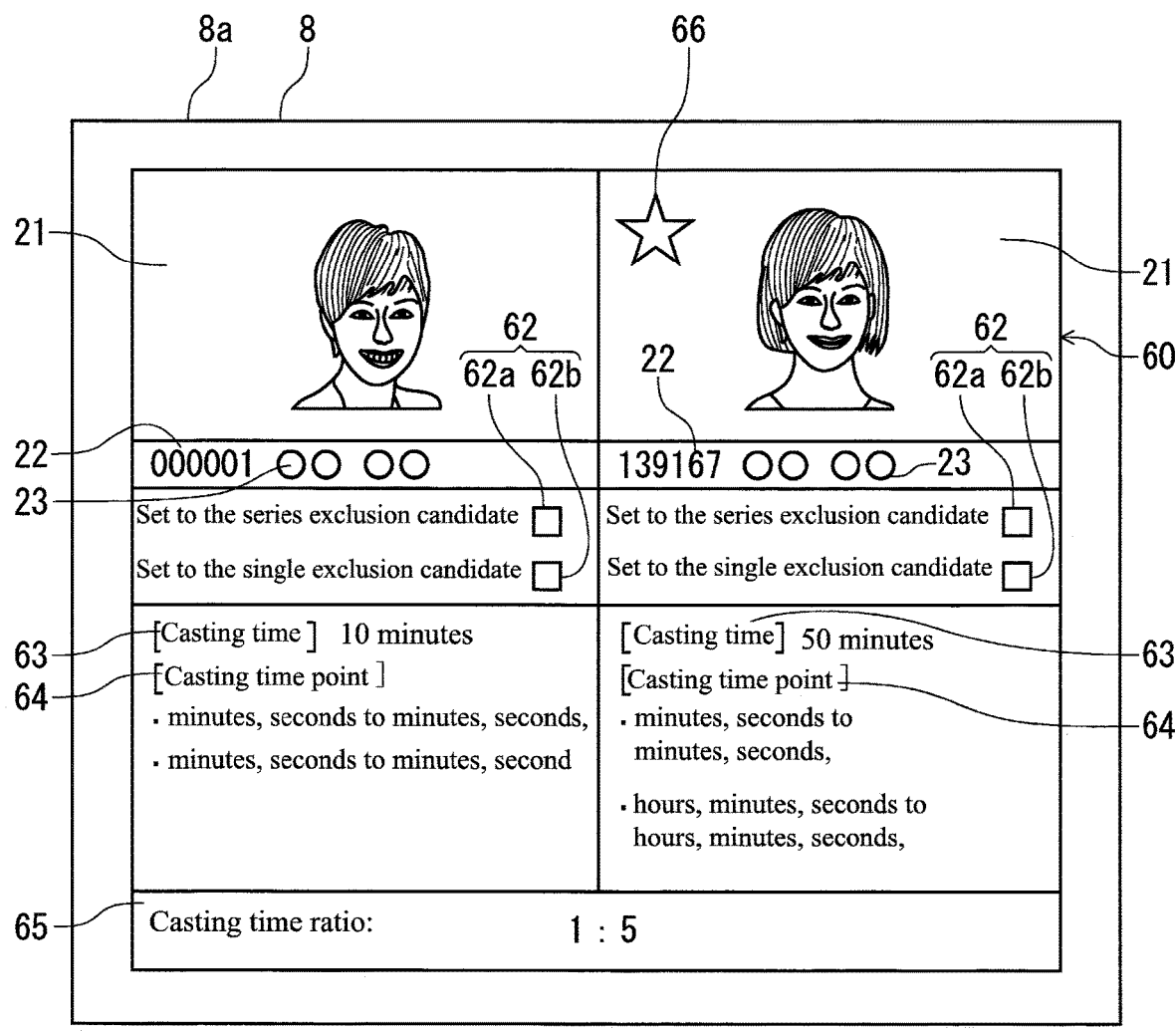
FIG. 4 is an explanatory view illustrating one example of the display mode of analogous person information in Embodiment 1.

As illustrated in FIG. 4, analogous person information 60 includes: characteristic information 21 (face images) which has been determined to be analogous in Step 5; personal ID 22 for identifying characteristic information 21; and full name 23 associated with personal ID 22. Analogous person output unit 47 reads characteristic information 21, personal ID 22, and full name 23 from person information storage unit 12, and displays them on display screen 8a of display unit 8.

Moreover, in the present embodiment, in addition to analogous person information 60, exclusion candidate input accepting unit 62, display time information 63, display time point information 64, and display time ratio information 65 are displayed on display screen 8a of display unit 8.

Exclusion candidate setting unit 48 displays exclusion candidate setting input accepting unit 62 on display unit 8.

Exclusion candidate setting input accepting unit 62 includes series exclusion candidate setting input accepting unit 62a, as well as single exclusion candidate setting input accepting unit 62b. Series exclusion candidate setting input accepting unit 62a and single exclusion candidate setting input accepting unit 62b are each provided so as to be associated with each characteristic information 21.

Series exclusion candidate setting input accepting unit 62a, as well as single exclusion candidate setting input accepting unit 62b, for example, include check boxes; wherein, if the user checks the check boxes, exclusion candidate setting unit 48 sets corresponding characteristic information 21 to series exclusion candidate 25a or single exclusion candidate 25b.

Display time information 63 is information indicating the length of time (display time) for which the person corresponding to characteristic information 21 is displayed in moving image data 17. Note that this example shows the display time in first-story moving image data 17a for series-configuring moving images which serves as the current process object.

Time information calculation unit 51 calculates the display time length of analogous persons and displays it as display time information 63 on display unit 8. For example, time information calculation unit 51, regarding each of multiple analogous persons, extracts all the moving image characteristic information which has been determined to correspond to each characteristic information 21 from moving image characteristic information storage unit 15 and specifies each key frame No. associated therewith. Subsequently, time information calculation unit 51 calculates the display time length of the person corresponding to characteristic information 21, in accordance with the number of the specified key frame Nos., that is, the number of the key frames with the abovementioned moving image characteristic information displayed therein.

In the example illustrated in FIG. 4, the display time (casting time) of the person corresponding to characteristic information 21 identified by personal ID 22 "000001" is 10 minutes, while the display time of the person corresponding to characteristic information 21 identified by personal ID 22 "139167" is 50 minutes.

Display time point information 64 is information indicating the time point (display time point) in which the person corresponding to characteristic information 21 is displayed in moving image data 17. Time information calculation unit 51 specifies the display time point of persons and displays it as display time point information 64 on display unit 8.

For example, time information calculation unit 51, regarding each of multiple analogous persons, extracts all the moving image characteristic information which has been determined to correspond to each characteristic information 21 from moving image characteristic information storage unit 15 and specifies each key frame No. associated therewith. Subsequently, the display time point of each key frame is specified in accordance with the specified key frame Nos., thereby specifying the display time point (casting time point) of each person.

Display time ratio information 65 is information indicating the ratio of the display time length (display time ratio) of each of multiple persons indicated by analogous person information 60.

Based on display time information 63 of analogous persons, time information calculation unit 51 calculates the display time ratio and displays it on display unit 8.

In the example illustrated in FIG. 4, because the display time indicated by display time information 63 of the person with personal ID 22 "000001" is 10 minutes, while the display time indicated by display time information 63 of the person with personal ID 22 "139167" is 50 minutes, time information calculation unit 51 calculates the display time ratio (casting time ratio) of the person with personal ID 22 "000001" to the person with personal ID 22 "139167" as 1:5.

Moreover, in the present embodiment, analogous person output unit 47 displays, on display unit 8, information for specifying a person satisfying the predetermined criterion regarding the display time length among multiple persons indicated by analogous person information 60.

For example, the predetermined criterion regarding the display time length is set to the criterion in which "the display time length ratio of each person to the total display time length of the analogous persons is the predetermined ratio or higher."

In this case, in the example of FIG. 4, analogous person output unit 47 displays, on display unit 8, information for specifying a person in which the display time length ratio of each person to the total display time length of the person with personal ID 22 "000001" and the person with personal ID 22 "139167" indicated by analogous person information 60 is the predetermined ratio or higher. Here, for descriptive purposes, the abovementioned predetermined ratio, for example, is set to 30%. Based on display time ratio information 65, analogous person output unit 47 specifies the person with personal ID 22 "139167" as a person having a display time length ratio of 30% or higher. Subsequently, analogous person output unit 47 displays specific sign 66 (star mark in the example of FIG. 4) in the vicinity of characteristic information 21 of personal ID 22 "139167" as information for specifying a person satisfying the predetermined criterion regarding the display time length and it is indicated that the specified person is the person with personal ID 22 "139167."

Note that the predetermined criterion regarding the display time length may be any criteria as long as they are regarding the display time length, and, for example, may be the criterion that "the display time length is the longest among the analogous persons," the criterion that "the display time length ratio is the highest among the analogous persons," or the criterion that "the display time length is the predetermined length or greater."

In Step 6, if analogous person information 60, etc. is displayed on display unit 8, exclusion candidate setting input accepting unit 62 accepts the input of the user (Step 7). The user browses analogous person information 60 displayed on display screen 8a, selects the person set as an exclusion candidate regarding characteristic information 21, and checks the check box of either series exclusion candidate setting input accepting unit 62a or single exclusion candidate setting input accepting unit 62b associated with characteristic information 21 of the selected person, via an input means such as a mouse. As a result, exclusion candidate setting input accepting unit 62 accepts the input of the user.

Upon selecting the person set as an exclusion candidate, the user can refer to various displayed information such as display time information 63, display time ratio information 65, and specific sign 66. Moreover, based on display time point information 64, the user can quickly access the scenes in which persons indicated by analogous person information 60 are displayed in moving image data 17, and confirm the persons displayed in moving images.

Note that in order to set characteristic information 21 of multiple persons indicated by analogous person information 60 to the exclusion candidate, the user may input a check in the check box of multiple exclusion candidate setting input accepting units 62. Moreover, in the state in which the user does not input a check in the check box of exclusion candidate setting input accepting unit 62, and neither of characteristic information 21 of multiple persons indicated by analogous person information 60 is set to the exclusion candidate, the process of Step 7 may be ended to proceed to the process of Step 9.

If exclusion candidate setting input accepting unit 62 accepts the input of the user, exclusion candidate setting unit 48 sets characteristic information 21 selected in accordance with the input of the user to the exclusion candidate.

For example, in the example of FIG. 4, characteristic information 21 of personal ID 22 "139167" is specified as a person satisfying the criterion that "the display time length ratio of each person to the total display time length of the analogous persons is 30% or higher," and specific sign 66 is assigned to information indicating the person with personal ID 22 "139167." Therefore, it can be surmised that the person with personal ID 22 "139167" is more likely to be cast than the person with personal ID 22 "000001." Consequently, the user can choose to set characteristic information 21 of personal ID 22 "000001" to the exclusion. For example, in the example of FIG. 4, if the user checks the check box of series exclusion candidate setting input accepting unit 62a associated with characteristic information 21 of personal ID 22 "000001," exclusion candidate setting unit 48 sets characteristic information 21 of personal ID 22 "000001" to series exclusion candidate 25a and stores setting information in person information storage unit 12. In the example of FIG. 2, the column of series exclusion candidate 25a of personal ID 22 "000001" will be checked.

In Step 7, if exclusion candidate setting unit 48 sets characteristic information 21 selected in accordance with the input of the user to the exclusion candidate, person information output unit 45 displays the cast checklist on display unit 8 (Step 9).

Note that as illustrated in FIG. 3, if it has been determined that there are no analogous persons in Step 5, Step 9 is processed without processing Steps 6 and 7.

The cast checklist includes information indicating the person corresponding to characteristic information 21 extracted by correspondence information extraction unit 43. That is, person information output unit 45 displays, on display unit 8, information indicating the person corresponding to characteristic information 21 extracted by correspondence information extraction unit 43. At this time, in Step 3, characteristic information 21 excluded from an extraction object for similarity determination is also displayed on display unit 8.

Information indicating the person corresponding to characteristic information 21 extracted by correspondence information extraction unit 43 includes both a person set to the exclusion and a person not set to the exclusion. Therefore, person information output unit 45 displays, on display unit 8, information indicating the person corresponding to characteristic information 21 set as an exclusion candidate by exclusion candidate setting unit 48, as well as information indicating the person corresponding to characteristic information 21 not set as an exclusion candidate.

As illustrated in FIG. 5, cast checklist 70 includes: characteristic information 21 extracted by correspondence information extraction unit 43; personal ID 22 for identifying characteristic information 21; and full name 23 associated with personal ID 22. The information is information indicating the person corresponding to characteristic information 21 extracted by correspondence information extraction unit 43, and includes information indicating the person corresponding to characteristic information 21 set as an exclusion candidate, as well as the information indicating the person corresponding to characteristic information 21 not set as an exclusion candidate.

Person information output unit 45 reads characteristic information 21, personal ID 22, and full name 23 from person information storage unit 12 and displays them on display screen 8a of display unit 8.

Moreover, cast checklist 70 includes display time information 63, as well as display time point information 64. As in the method mentioned above in Step 6, display time information 63 and display time point information 64 are calculated by time information calculation unit 51 and displayed on display screen 8a of display unit 8.

Note that instead of calculating display time information 63 and display time point information 64 in Steps 6 and 9, time information calculation unit 51 may be configured to calculate display time information 63 and display time point information 64 in Step 2 regarding all characteristic information 21 extracted by correspondence information extraction unit 43. In this case, time information calculation unit 51 may store calculated display time information 63 and display time point information 64 in storage unit 5, and in Steps 6 and 9, time information calculation unit 51 may read display time information 63 and display time point information 64 from storage unit 5 and display them on display unit 8.

Moreover, exclusion candidate setting input accepting unit 62, exclusion determination input accepting unit 72, and exclusion candidate releasing input accepting unit 73 are provided in cast checklist 70. These input accepting units are associated with characteristic information 21 of each person.

Exclusion determination input accepting unit 72 and exclusion candidate releasing input accepting unit 73 are provided to the person of characteristic information 21 which has been set as an exclusion candidate. If exclusion determination input accepting unit 72 accepts the input of the user, exclusion determination setting unit 49 sets corresponding characteristic information 21 to exclusion determination. Moreover, if exclusion candidate releasing input accepting unit 73 accepts the input of the user, exclusion candidate setting unit 48 releases corresponding characteristic information 21 from the exclusion candidate. Exclusion determination input accepting unit 72, as well as exclusion candidate releasing input accepting unit 73, for example, include check boxes; wherein, if the user checks the check boxes, the input of the user is accepted.

Exclusion candidate setting input accepting unit 62 is provided to the person of characteristic information 21 which has not been set as an exclusion candidate, such that the exclusion candidate can be set by the selection of the user.

In the present embodiment, person information output unit 45 differentiates the display mode of the information indicating the person corresponding to characteristic information 21 set as an exclusion candidate by exclusion candidate setting unit 48, from the display mode of the information indicating the person corresponding to characteristic information 21 not set as an exclusion candidate and displays it on display unit 8.

In the example of FIG. 5, person information output unit 45 displays, on display screen 8a, prohibitive sign 75 for specifying information indicating the person corresponding to characteristic information 21 set as an exclusion candidate. As a result, the display mode of the information indicating the person corresponding to characteristic information 21 set as an exclusion candidate by exclusion candidate setting unit 48 is differentiated from the display mode of the information indicating the person corresponding to characteristic information 21 not set as an exclusion candidate.

In the example of FIG. 5, in the abovementioned Step 7, the case is assumed in which characteristic information 21 of personal ID 22 "000001" is set to series exclusion candidate 25a. Therefore, in FIG. 5, prohibitive sign 75 is assigned to information indicating the person corresponding to characteristic information 21 with personal ID 22 "000001". Moreover, as mentioned above with reference to FIG. 2, characteristic information 21 of personal ID 22 "000004" is also set to single exclusion candidate 25b. Therefore, prohibitive sign 75 is also assigned to information indicating the person corresponding to characteristic information 21 with personal ID 22 "000004".

Moreover, person information output unit 45 displays, on display unit 8, information indicating the person corresponding to characteristic information 21 extracted by correspondence information extraction unit 43, in the sequence based on the display time length.

In the example of FIG. 5, it is displayed in the order of display time length. Therefore, the display time (casting time) of the person with personal ID 22 "138716" disposed to the left of FIG. 5 is the longest, while the display time (casting time) of the person with personal ID 22 "000001" disposed to the right of FIG. 5 is the shortest.

The user browses cast checklist 70 displayed on display screen 8a and determines whether a person set as an exclusion candidate is excluded from the disclosed cast information. Regarding the person who the user has determined to exclude, if exclusion determination input accepting unit 72 accepts the input of the user, exclusion determination setting unit 49 sets corresponding characteristic information 21 to exclusion determination.

For example, in the example of FIG. 5, if the user checks the check box of exclusion determination input accepting unit 72 associated with characteristic information 21 of personal ID 22 "000001," exclusion determination information 26 will be input. Based on input exclusion determination information 26, exclusion determination setting unit 49 sets characteristic information 21 of personal ID 22 "000001" to exclusion determination and stores the setting information in person information storage unit 12. In the example of FIG. 2, the column of the exclusion determination of personal ID 22 "000001" will be checked.

Moreover, regarding the person who the user has determined not to exclude from the cast information among the persons set as exclusion candidates, if exclusion candidate releasing input accepting unit 73 accepts the input of the user, exclusion candidate setting unit 48 releases corresponding characteristic information 21 from the exclusion candidate. That is, corresponding characteristic information 21 is no longer the exclusion candidate. If exclusion candidate setting unit 48 releases corresponding characteristic information 21 from the exclusion candidate, person information output unit 45 sets display of prohibitive sign 75 to non-display.

For example, in the example of FIG. 5, if the user checks the check box of exclusion candidate releasing input accepting unit 73 associated with characteristic information 21 of personal ID 22 "000004," exclusion candidate setting unit 48 releases characteristic information 21 of personal ID 22 "000004" from the exclusion candidate and stores the information in person information storage unit 12. In the example of FIG. 2, the check mark of the column of single exclusion candidate 25b of personal ID 22 "000004" will be deleted. If characteristic information 21 of personal ID 22 "000004"

is released from the exclusion candidate, person information output unit 45 sets, to non-display, prohibitive sign 75 displayed next to characteristic information 21 (face images) of personal ID 22 "000004."

Moreover, if the exclusion candidate is released, main control unit 41 switches the display of the check boxes of exclusion determination input accepting unit 72 and exclusion candidate releasing input accepting unit 73 of the corresponding person to the display of the check boxes of exclusion candidate setting input accepting unit 62 and displays them on display screen 8a. Therefore, in cast checklist 70 displayed on display screen 8a, a person with the exclusion candidate released is displayed in the same display mode as other persons not set as the exclusion candidates.

In this way, in cast checklist 70 displayed on display screen 8a, if the setting of the exclusion candidate is switched in accordance with the input of the user, the display mode of information indicating each person is also switched.

Note that if a need to set a person not set as the exclusion candidate to the exclusion candidate arises for some reason or other, exclusion candidate setting input accepting unit 62 accepts the input of the user, whereby exclusion candidate setting unit 48 sets corresponding characteristic information 21 to the exclusion candidate. If corresponding characteristic information 21 is set to the exclusion candidate, the display of the person in cast checklist 70 is switched to the display of the person of the exclusion candidate and prohibitive sign 75 is displayed in the person by person information output unit 45.

As in the abovementioned person of the exclusion candidate, regarding the person who has been switched to the display of the person of the exclusion candidate, the user selects exclusion determination or exclusion candidate release and inputs instructions.

Upon confirmation of cast checklist 70 by the user, information of a person not set as an exclusion candidate is listed in disclosed cast information (not illustrated), while information of a person set as an exclusion determination is not listed in the disclosed cast information. The disclosed cast information (not illustrated), for example, may include face images (characteristic information 21), full name 23 and other information 33 for disclosure. Moreover, main control unit 41 may read information listed in the disclosed cast information from person information storage unit 12, display it on display unit 8, and create disclosed cast information.

Moreover, if the disclosure of face images (characteristic information 21) is not permitted, main control unit 41 may read image 32 for disclosure, instead of face images (characteristic information 21), from person information storage unit 12, display them on display unit 8, and include them in the disclosed cast information.

In the abovementioned example, while the case of reading the abovementioned first-story moving image data 17a for series-configuring moving images (FIG. 2) has been assumed and described, second to fifth-story moving image data 17a are also subjected to the same process.

As mentioned above, characteristic information 21 set to series exclusion candidate 25a in at least one of multiple moving image data 17a for series-configuring moving images configuring the same series is excluded from characteristic information 21 extracted by the below-mentioned correspondence information extraction unit 43, in the process in which other moving image data 17a for series-configuring moving images configuring the same series serves as the object.

For example, in the abovementioned Step 7, if characteristic information 21 of personal ID 22 "000001" is set to series exclusion candidate 25a, and the setting of the exclusion candidate is not released in cast checklist 70 displayed in FIG. 5, the setting of series exclusion candidate 25a to characteristic information 21 of personal ID 22 "000001" is maintained. In this case, in the process of other second to fifth-story moving image data 17a for series-configuring moving images, characteristic information 21 of personal ID 22 "000001" is excluded from the extraction object of correspondence information extraction unit 43 in Step 2.

Moreover, if extraction object designation unit 44 designates characteristic information 21 serving as the extraction object regarding multiple moving image data 17a configuring the specific series, when moving image data 17 other than the specific series is subjected to the process of Step 2, the abovementioned characteristic information 21 is excluded from the extraction object of correspondence information extraction unit 43.

That is, if extraction object designation unit 44 designates characteristic information 21 serving as the extraction object, characteristic information 21 designated by extraction object designation unit 44 is excluded from characteristic information 21 extracted by correspondence information extraction unit 43, in moving image data 17 other than multiple moving image data (moving image data 17a for series-configuring moving images) configuring the specific series.

In the example of FIG. 2, as indicated by application scope information 28, the characteristic information of personal ID 22 "000002" is set to characteristic information 21 only used for moving image data 17 of the specific series.

Therefore, as mentioned above, if the process of first to fifth-story moving image data 17a for series-configuring moving images configuring the drama "xxxxx" ends, characteristic information 21 is excluded from the extraction object of correspondence information extraction unit 43, in the process of other moving image data 17 subsequently executed.

As described above, person information display apparatus 1 according to Embodiment 1 includes: characteristic extraction unit 42 for extracting the facial characteristics of persons from moving image data 17; and correspondence information extraction unit 43 for extracting characteristic information 21 corresponding to the facial characteristics extracted by characteristic extraction unit 42 from pre-stored characteristic information 21 on the faces of multiple persons.

Therefore, in accordance with person information display apparatus 1, the persons displayed in moving image data 17 can be extracted more rapidly.

Moreover, as mentioned above, exclusion candidate setting unit 48 sets characteristic information 21 selected in accordance with the input of the user to the exclusion candidate among analogous multiple characteristic information 21 if multiple characteristic information 21 extracted by correspondence information extraction unit 43 is analogous.

Consequently, regarding persons with analogous facial characteristics, if a person who may correspond to erroneous extraction is selected in accordance with the input of the user, the person who may correspond to erroneous extraction can be set as an exclusion candidate. Moreover, a person who need not be included in the disclosed cast information for some reason or other, such as a short display time (casting time), for example, in addition to erroneous extraction, can be set as an exclusion candidate.

Therefore, more accurate and appropriate disclosed cast information can be created.

Moreover, faces displayed in moving image data 17 have various angles, sizes, expressions, etc. In addition, the moving images may allow the facial characteristic of one person to change in accordance with the scene, or allow the facial characteristic to change in accordance with the hairstyle and makeup.

Therefore, among characteristic information 21 extracted by correspondence information extraction unit 43 due to its correspondence, characteristic information 21 of a person not displayed in moving image data 17 may actually be present. Consequently, in order to create accurate disclosed cast information, it must be confirmed whether the extraction results of correspondence information extraction unit 43 are not erroneous.

Regarding this, person information display apparatus 1, as mentioned above, includes exclusion candidate setting unit 48, and exclusion candidate setting unit 48 can set, to the exclusion candidate, characteristic information 21 of a person who may be erroneously extracted. Additionally, the user can determine whether the person set as an exclusion candidate is excluded from the disclosed cast information (not illustrated), based on the abovementioned information (cast checklist 70 in the abovementioned example) displayed by person information output unit 45. Therefore, the abovementioned more accurate disclosed cast information can be created.

As mentioned above, person information display apparatus 1 allows the faster and more accurate provision of information indicating a person displayed in moving images.

Further, person information output unit 45 differentiates the display mode of the information indicating the person corresponding to characteristic information 21 set as an exclusion candidate by exclusion candidate setting unit 48, from the display mode of the information indicating the person corresponding to characteristic information 21 not set as an exclusion candidate, and displays it.

Therefore, the user can rapidly and intuitively grasp which person is set as the exclusion candidate in the displayed information of persons.

Moreover, as mentioned above regarding series exclusion candidate 25*a*, in person information display apparatus 1, if exclusion candidate setting unit 48 sets characteristic information 21 to the exclusion candidate (series exclusion candidate 25*a* in the abovementioned example) in at least one of multiple moving image data (moving image data 17*a* for series-configuring moving images) configuring the same series, characteristic information 21 set to the exclusion candidate is excluded from characteristic information 21 extracted by correspondence information extraction unit 43, in other moving image data (moving image data 17*a* for series-configuring moving images) configuring the same series.

As a result, a more rapid process can be executed regarding other moving images configuring the same series.

In person information display apparatus 1, analogous person determination unit 46 determines whether multiple characteristic information 21 extracted by correspondence information extraction unit 43 is analogous, based on prestored analogous relationship information 36 indicating analogous persons.

Therefore, analogous person determination unit 46 can rapidly determine whether characteristic information 21 is analogous.

Moreover, analogous person determination unit 46 determines that multiple characteristic information 21 extracted by correspondence information extraction unit 43 is analogous if correspondence information extraction unit 43 extracts multiple characteristic information 21 as characteristic information 21 corresponding to one facial characteristic.

If multiple characteristic information 21 corresponding to one facial characteristic is extracted, extracted multiple characteristic information 21 may include erroneously extracted characteristic information 21.

Therefore, because characteristic information 21 which may be erroneously extracted can be set to the exclusion candidate, more accurate disclosed cast information can be created.

Further, person output unit 47 displays, on display unit 8, information indicating a person (analogous person) corresponding to each of analogous multiple characteristic information 21 as analogous person information 60 if multiple characteristic information 21 extracted by correspondence information extraction unit 43 is analogous.

As a result, the user can easily grasp information regarding analogous persons.

Moreover, time information calculation unit 51, regarding multiple persons indicated by analogous person information 60, calculates display time information 63 indicating the display time length of each person in moving image data 17 (in the abovementioned example, moving image data 17*a* for series-configuring moving images), and displays it on display unit 8.

Therefore, the user can select a person set as an exclusion candidate, taking the display time length of each person displayed as analogous person information 60 into consideration.

Further, analogous person output unit 47 displays, on display unit 8, information for specifying a person satisfying the predetermined criterion regarding the display time length in moving image data 17 among multiple persons indicated by analogous person information 60.

Therefore, the user can rapidly grasp a person satisfying the predetermined criterion regarding the display time length among the persons displayed as analogous person information 60. Additionally, the person set as an exclusion candidate can be selected based on the information.

Moreover, person information output unit 45 displays, on display unit 8, information indicating the person corresponding to characteristic information 21 extracted by correspondence information extraction unit 43, in the sequence based on the display time length.

As a result, the user can rapidly and intuitively grasp the difference based on the display time length, regarding multiple persons corresponding to characteristic information 21 extracted by correspondence information extraction unit 43. Additionally, a person excluded from the disclosed cast information can be determined based on the information.

Moreover, person information display apparatus 1 includes extraction object designation unit 44 for designating characteristic information 21 serving as the extraction object regarding multiple moving image data 17*a* configuring the specific series.

Therefore, the application scope of the desired characteristic information 21 can be limited to moving image data 17 of the specific series. For example, if a face has special makeup peculiar to the character of the moving images of the series, etc. in the moving images of the specific series, characteristic information 21 of the face having the special makeup, etc. can be stored in person information storage unit 12, and only moving image data 17*a* for series-configuring moving images of the series can be set to characteristic information 21 serving as the extraction object.

Embodiment 2

Figure 6:
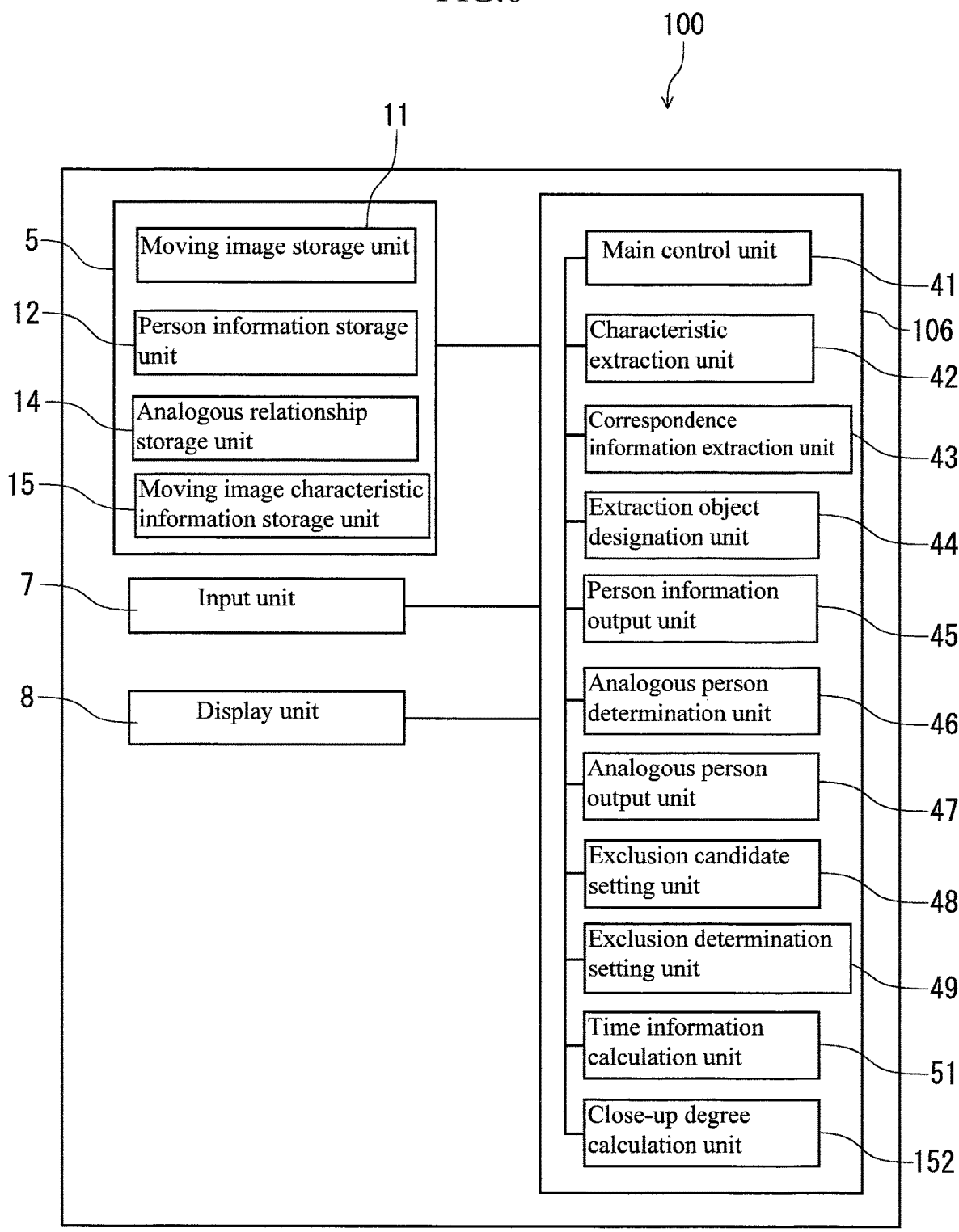
FIG. 6 is a functional block diagram of a person information display apparatus according to Embodiment 2.

FIG. 6 illustrates a functional block diagram of person information display apparatus 100 according to Embodiment 2. A portion of each function unit of person information display apparatus 100 is the same as person information display apparatus 1 according to Embodiment 1. Here, points differing from the abovementioned Embodiment 1 will mainly be described. In FIG. 6, identical components will be labelled with identical labels as in Embodiment 1.

Person information display apparatus 100 has the function of the abovementioned person information display apparatus 1 and includes each function unit of person information display apparatus 1 illustrated in FIG. 1. The differing point of person information display apparatus 1 of Embodiment 1 is that person information display apparatus 100 includes close-up degree calculation unit 152. In person information display apparatus 100, control unit 106 includes close-up degree calculation unit 152, in addition to each function unit possessed by control unit 6 of the abovementioned person information display apparatus 1.

Close-up degree calculation unit 152 calculates a close-up degree serving as the ratio of the area of the face of the person in the frame (key frame in this example) of moving image data 17. Moreover, close-up degree calculation unit 152 displays, on display unit 8, information based on the close-up degree.

Next, the operation of person information display apparatus 100 will be described.

Person information display apparatus 100 executes a process different from person information display apparatus 1 in the process of Step 6 among the processes indicated in the flowchart of FIG. 3. The processes in other steps (Steps 1 to 5, 7, and 9) are the same as the processes mentioned above regarding person information display apparatus 1. Here, the processes differing from person information display apparatus 1 will mainly be described.

Person information display apparatus 100 executes Steps 1 to 5 as in Embodiment 1. Because the processes of Steps 1 to 5 are the same as in Embodiment 1, descriptions thereof are omitted.

In Step 5, if analogous person determination unit 46 determines that there are analogous persons, analogous person output unit 47 displays, on display unit 8, information indicating a person (analogous person) corresponding to each of analogous multiple characteristic information 21 as analogous person information 60 (Step 6).

Figure 7:
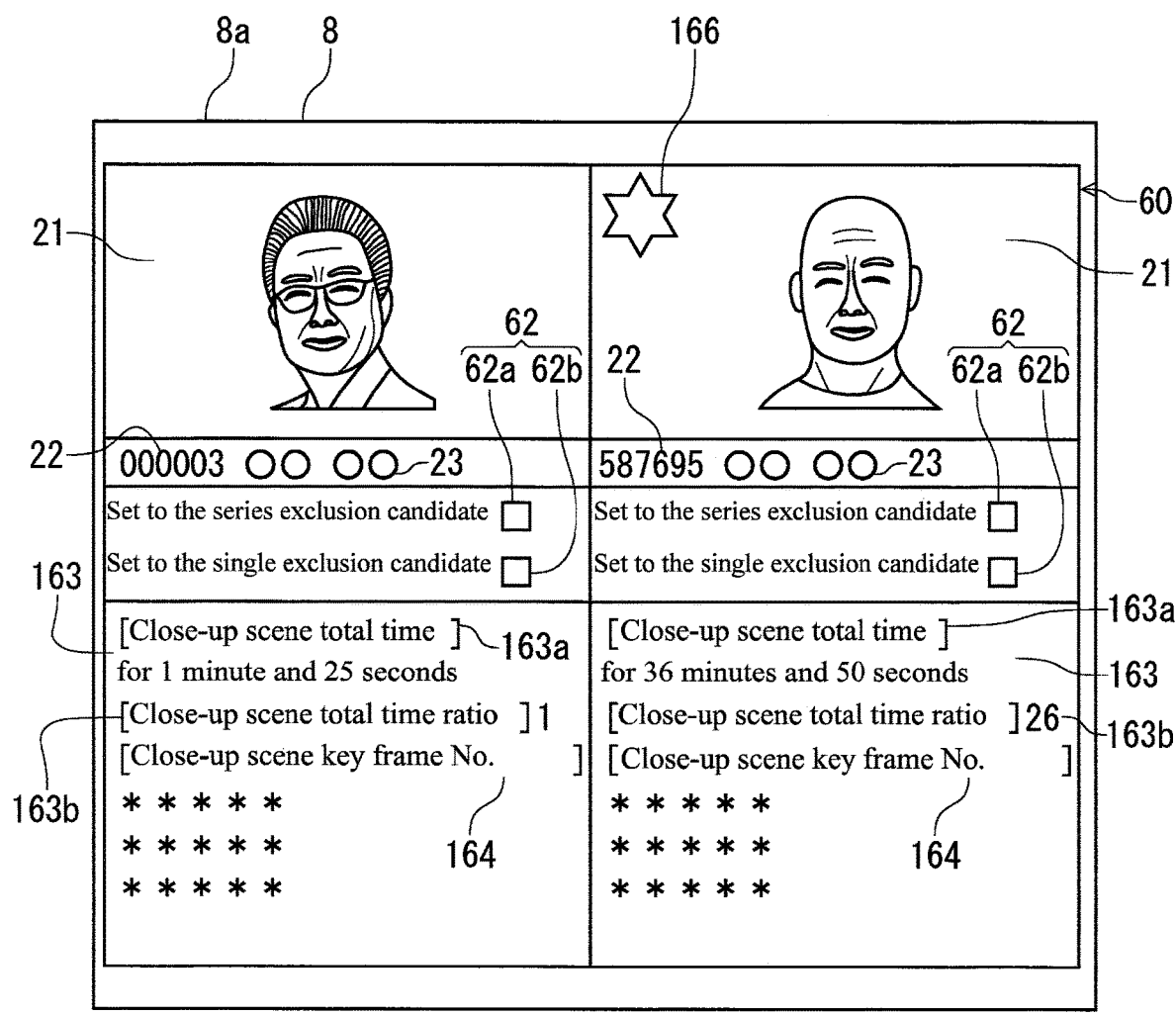
FIG. 7 is an explanatory view illustrating one example of the display mode of analogous person information in Embodiment 2.

FIG. 7 illustrates analogous person information 60 for the case in which the person with personal ID 22 "000003" and the person with personal ID 22 "587695" are analogous persons. As illustrated in FIG. 7, analogous person information 60 includes: characteristic information 21 which has been determined to be analogous in Step 5; personal ID for identifying characteristic information 21; and full name 23 associated with personal ID. Moreover, in addition to analogous person information 60, exclusion candidate setting input accepting unit 62 is displayed on display screen 8a of display unit 8. The display and configuration of analogous person information 60 and exclusion candidate setting input accepting unit 62 are the same as mentioned above regarding person information display apparatus 1.

The point differing from Embodiment 1 is that in addition to analogous person information 60, information 163 based on the close-up degree is displayed in person information display apparatus 100. In this example, close-up scene total time 163a and close-up scene total time ratio 163b are displayed as information 163 based on the close-up degree. Moreover, in addition to information 163 based on the close-up degree, key frame No. 164 of the close-up scene is displayed.

The close-up scene is a scene in which the face of the person is displayed in close-up (enlarged and displayed) in moving image data 17. In this example, key frames having a predetermined threshold or higher of the close-up degree are set to the close-up scene.

The close-up degree is the ratio of the area of the face of the abovementioned analogous person in the frame (key frame in this example) of moving image data 17.

Close-up degree calculation unit 152 calculates the close-up degree. First, close-up degree calculation unit 152, regarding each of multiple analogous persons, extracts all the moving image characteristic information which has been determined to correspond to each characteristic information 21 from moving image characteristic information storage unit 15, and specifies the area of the image part of the face corresponding to each moving image characteristic information. Subsequently, the ratio of the area of the image part of the face (area of the face) in the area of the key frames is calculated as the close-up degree.

Subsequently, close-up degree calculation unit 152 calculates information 163 based on the close-up degree using the close-up degree. In this example, regarding each person indicated by analogous person information 60, close-up degree calculation unit 152 calculates, as close-up scene total time 163a, the total time of the display time displayed in the close-up degree having the predetermined threshold or higher in moving image data 17a for series-configuring moving images, and displays it on display screen 8a. Close-up degree calculation unit 152 calculates the total time of the display time, based on the number of key frames having a predetermined threshold or higher of the close-up degree.

Moreover, close-up degree calculation unit 152 calculates the ratio of close-up scene total time 163a of each of multiple persons indicated by analogous person information 60, and displays it as close-up scene total time ratio 163b on display screen 8a.

In the example of FIG. 7, because close-up scene total time 163a of the person with personal ID 22 "000003" is 1 minute and 25 seconds, while close-up scene total time 163a of the person with personal ID 22 "587695" is 36 minutes and 50 seconds, close-up scene total time ratio 163b of both is 1:26.

Moreover, in this example, close-up degree calculation unit 152 displays, on display screen 8a, the key frame No. of the key frames having a predetermined threshold or higher of the close-up degree as close-up scene key frame No. 164. The abovementioned key frame No., along with the abovementioned moving image characteristic information read upon calculating the close-up degree, is read from moving image characteristic information storage unit 15 by close-up degree calculation unit 152.

Note that instead of the key frame No., the reproduction time point of the key frames associated with the key frame No. may be displayed on display screen 8a.

Moreover, analogous person output unit 47 displays, on display unit 8, information for specifying a person satisfying the predetermined criterion regarding the close-up degree among multiple persons indicated by analogous person information 60. In this example, the criterion that "close-up scene total time 163a is the longest among analogous persons" will be set and described. Note that as mentioned above, because close-up scene total time 163a is calculated using the close-up degree, the abovementioned criterion is criterion regarding the close-up degree.

In this case, because close-up scene total time 163a of the person with personal ID 22 "587695" is longer than close-up scene total time 163a of the person with personal ID 22 "000003," analogous person output unit 47 displays, on screen 8a, information for specifying the person with personal ID 22 "587695."

In this example, analogous person output unit 47 displays specific sign 166 (star mark in the example of FIG. 7) in the vicinity of characteristic information 21 of personal ID 22 "587695" as information indicating the specified person and it is indicated that the specified person is the person with personal ID 22 "587695."

Note that the predetermined criterion regarding the close-up degree may be any criteria regarding the close-up degree. The predetermined criterion regarding the close-up degree includes a criterion set using the close-up degree. For example, the criterion that "close-up scene total time ratio 163b is the predetermined threshold or higher" may be set.

In Step 6, if analogous person information 60, etc. is displayed on display unit 8, exclusion candidate setting input accepting unit 62 accepts the input of the user (Step 7). Because the process of Step 7 is the same as in Embodiment 1, a description thereof is omitted. Note that in Step 7, based on close-up scene key frame No. 164, the user can quickly access the scene in which persons indicated by analogous person information 60 are displayed in the close-up degree having the predetermined threshold or higher and confirm the persons displayed in moving image data 17.

Moreover, in the example of FIG. 7, characteristic information 21 of personal ID 22 "587695" is specified as a person satisfying the criterion that "the longest close-up scene total time 163a among the analogous persons," and specific sign 166 is assigned to information indicating the person with personal ID 22 "587695." Therefore, it can be surmised that the person with personal ID 22 "587695" is more likely to be cast than the person with personal ID 22 "000003." Consequently, the user, for example, can choose to set characteristic information 21 of personal ID 22 "000003" to the exclusion.

Next, if the process proceeds to Step 9, as in Embodiment 1, person information output unit 45 displays cast checklist 70 on display unit 8. Because the process of Step 9 is the same as in Embodiment 1, a description thereof is omitted.

Note that in the example of the abovementioned FIG. 5, in cast checklist 70, person information output unit 45 displays, on display unit 8, information indicating the person corresponding to characteristic information 21 extracted by correspondence information extraction unit 43, in the order of display time length.

In the present embodiment, the sequence based on the close-up degree may be employed as this display order. As one example, person information output unit 45 displays, on display unit 8, information indicating the person corresponding to characteristic information 21 extracted by correspondence information extraction unit 43, in the sequence based on the close-up degree calculated by close-up degree calculation unit 152. For example, information indicating the person corresponding to characteristic information 21 extracted by correspondence information extraction unit 43 may be displayed in order of close-up scene total time 163a length calculated using the close-up degree.

Moreover, as another example, person information output unit 45 displays, on display unit 8, information indicating the person corresponding to characteristic information 21 extracted by correspondence information extraction unit 43, in the sequence based on the display time length and close-up degree of each person in moving image data 17.

For example, if it is displayed in order of the display time length of each person in moving image data 17 and the length of close-up scene total time 163a of each person calculated using the close-up degree, it may be displayed in order of the overall ranking, such that the display time length of each person and the length of close-up scene total time 163a may be standardized to calculate the overall ranking. Note that upon calculating the overall ranking, the desired weighting may be carried out on both the display time length of each person and the length of close-up scene total time 163a.

Moreover, the display time length and the length of close-up scene total time 163a regarding each person may each be independently ranked, with the overall ranking calculated based on the total of the ranking and displayed in order of overall ranking.

Moreover, while display time information 63 and display time point information 64 are displayed in cast checklist 70 in the example of the abovementioned FIG. 5, in addition thereto, information 163 based on the close-up degree as exemplified in FIG. 7 may be displayed. Moreover, instead of display time information 63 and display time point information 64, information 163 based on the close-up degree may be displayed. Note that if information 163 based on the close-up degree is displayed in cast checklist 70, close-up degree calculation unit 152 may calculate information 163 based on the close-up degree of each person regarding all the persons (all the persons displayed in cast checklist 70) corresponding to characteristic information 21 extracted by correspondence information extraction unit 43 and display it on display screen 8a.

In person information display apparatus 100 according to Embodiment 2, close-up degree calculation unit 152 calculates a close-up degree serving as the ratio of the area of the face of the person in the frame (key frame in this example) of moving image data 17, and displays, on display unit 8, calculated information 163 based on the close-up degree.

Therefore, the user can select a person set as an exclusion candidate, taking the close-up degree of each person displayed as analogous person information 60 into consideration.

Moreover, in Embodiment 2, close-up scene total time 163a and close-up scene total time ratio 163b are displayed as information 163 based on the close-up degree.

For example, it can be surmised that the longer close-up scene total time 163a, the higher the degree in which the face of the person is displayed in close-up. Therefore, as the indexes upon selecting the person set as an exclusion candidate, close-up scene total time 163a and close-up scene total time ratio 163b can be used.

Moreover, in the person information display apparatus, analogous person output unit 47 displays, on display unit 8, information for specifying a person satisfying the predetermined criterion regarding the close-up degree calculated by close-up degree calculation unit 152 among multiple persons indicated by analogous person information 60.

Therefore, the user can rapidly grasp a person satisfying the predetermined criterion regarding the close-up degree among the persons displayed as analogous person information 60. Additionally, the person set as an exclusion candidate can be selected based on the information.

Further, as mentioned above as one example of the display order, person information output unit 45 displays, on display unit 8, information indicating the person corresponding to characteristic information 21 extracted by correspondence information extraction unit 43, in the sequence based on the close-up degree calculated by close-up degree calculation unit 152.

As a result, the user can rapidly and intuitively grasp the differences based on the close-up degree, regarding multiple persons corresponding to characteristic information 21 extracted by correspondence information extraction unit 43. Additionally, a person excluded from the disclosed cast information can be determined based on the information.

Moreover, as mentioned above as another example of the display order, person information output unit 45 displays, on display unit 8, information indicating the person corresponding to characteristic information 21 extracted by correspondence information extraction unit 43, in the sequence based on the display time length and the close-up degree of each person in moving image data 17.

As a result, the user can rapidly and intuitively grasp the differences based on the display time length and the close-up degree, regarding multiple persons corresponding to characteristic information 21 extracted by correspondence information extraction unit 43. Additionally, a person excluded from the disclosed cast information can be determined based on the information.

Embodiment 3

The configuration of the person information display apparatus according to Embodiment 3 is the same as the configuration of person information display apparatus 1 according to Embodiment 1 illustrated in FIG. 1. Therefore, a description will be provided using the same components and labels as in Embodiment 1.

As mentioned above, in Embodiment 1, exclusion candidate setting unit 48, regarding analogous persons, sets characteristic information 21 selected in accordance with the input of the user to the exclusion candidate. However, in Embodiment 3 described below, exclusion candidate setting unit 48, regarding analogous persons, sets characteristic information 21 automatically selected in accordance with the predetermined criterion to the exclusion candidate.

Figure 8:
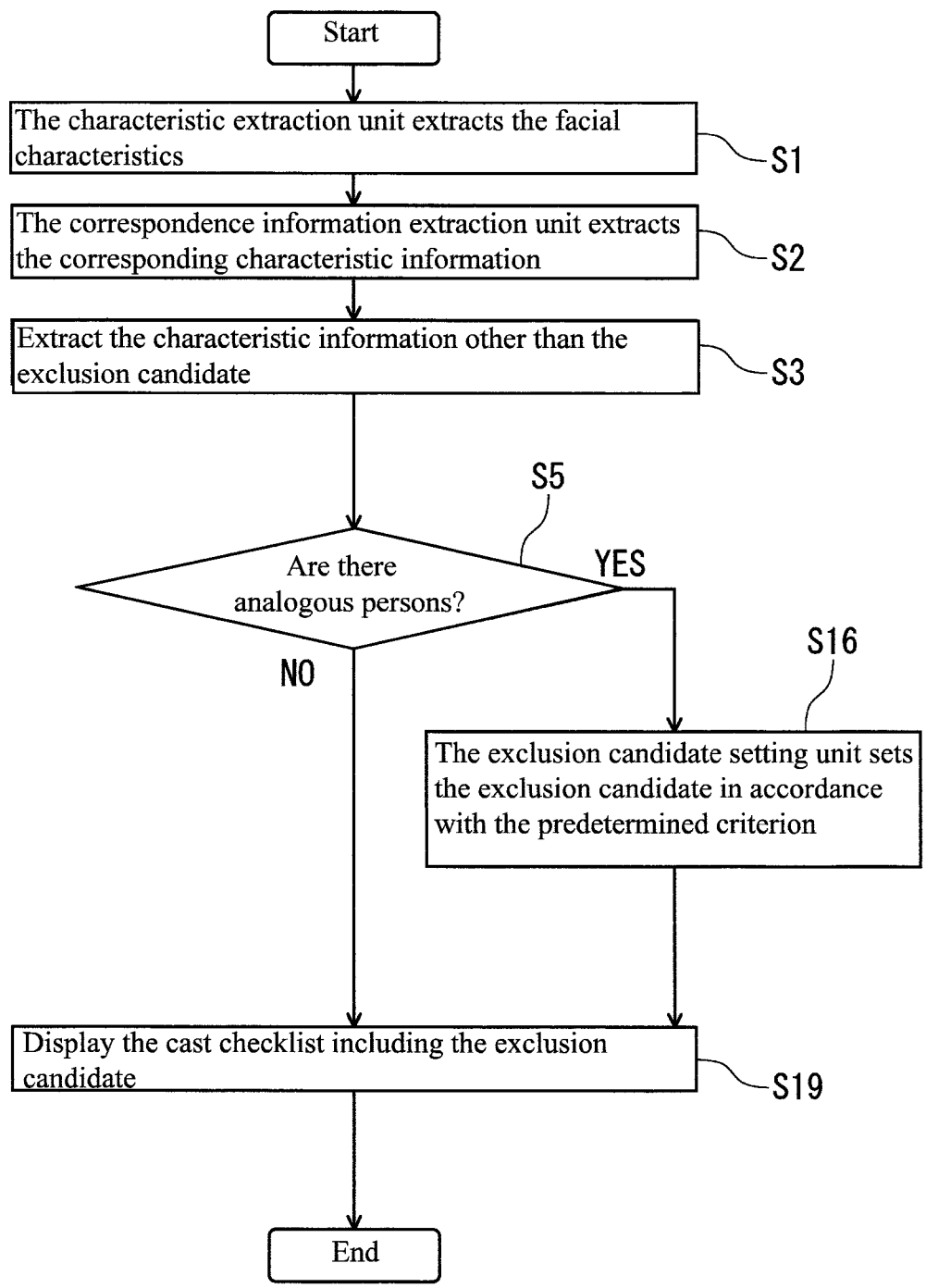
FIG. 8 is a flowchart illustrating the operation of a person information display apparatus according to Embodiment 3.

Person information display apparatus 1 according to Embodiment 3 executes the process illustrated in the flowchart of FIG. 8. The processes of Steps 1 to 5 illustrated in FIG. 8 are the same as those described in Embodiment 1 with reference to FIG. 3.

Here, the points differing from the abovementioned Embodiment 1 will mainly be described.

Person information display apparatus 1 executes Steps 1 to 5 as in Embodiment 1. Because the processes of Steps 1 to 5 are the same as in Embodiment 1, descriptions thereof are omitted.

In Step 5, if analogous person determination unit 46 determines that there are analogous persons, the process proceeds to Step 16. In Step 16, exclusion candidate setting unit 48 sets, to the exclusion candidate, characteristic information 21 of a person satisfying the predetermined criterion among persons (analogous persons) corresponding to each of analogous multiple characteristic information 21.

For example, exclusion candidate setting unit 48 selects characteristic information 21 corresponding to a person satisfying the predetermined criterion regarding the display time length in moving image data 17 among the analogous persons and sets it to the exclusion candidate.

Here, the case will be described using the predetermined criterion regarding the display time length, which are the criterion that "the display time length ratio of each person to the total display time length of the analogous persons is the predetermined ratio or lower."

In this case, as in Embodiment 1, if the person with personal ID 22 "000001" and the person with personal ID 22 "139167" exemplified in FIG. 4 are analogous persons, exclusion candidate setting unit 48 sets, to the exclusion candidate, characteristic information 21 of a person in which the display time length ratio of each person to the total display time length of the person with personal ID 22 "000001" and the person with personal ID 22 "139167" indicated by analogous person information 60 is the predetermined ratio or lower.

Here, for descriptive purposes, the abovementioned predetermined ratio, for example, is set to 20%. Based on display time ratio information 65, exclusion candidate setting unit 48 selects characteristic information 21 of the person with personal ID 22 "000001" having a display time length ratio of 20% or lower and sets characteristic information 21 of personal ID 22 "000001" to the exclusion candidate.

Note that the predetermined criterion regarding the display time length may be any criteria, and, for example, may be the criterion that "the display time length is the shortest among the analogous persons," the criterion that "the display time length ratio is the lowest among the analogous persons," or the criterion that "the display time length is the predetermined length or smaller."

Unlike Embodiment 1, at the stage of Step 16, analogous person information 60 is not displayed on display screen 8a of display unit 8. Therefore, in Embodiment 3, the display exemplified in FIG. 4 is not displayed.

In Step 16, if exclusion candidate setting unit 48 sets characteristic information 21 selected in accordance with the predetermined criterion to the exclusion candidate, cast checklist 270 including the person set as an exclusion candidate is displayed (Step 19). Note that as illustrated in FIG. 8, if it has been determined that there are no analogous persons in Step 5, Step 9 is processed without processing Step 16.

The point differing from the process of Step 9 in Embodiment 1 is that person information output unit 45 displays, on display unit 8, information indicating the person corresponding to characteristic information 21 extracted by correspondence information extraction unit 43, while analogous person output unit 47 displays, on display unit 8, information indicating the abovementioned analogous persons as analogous person information 260.

Figure 9:
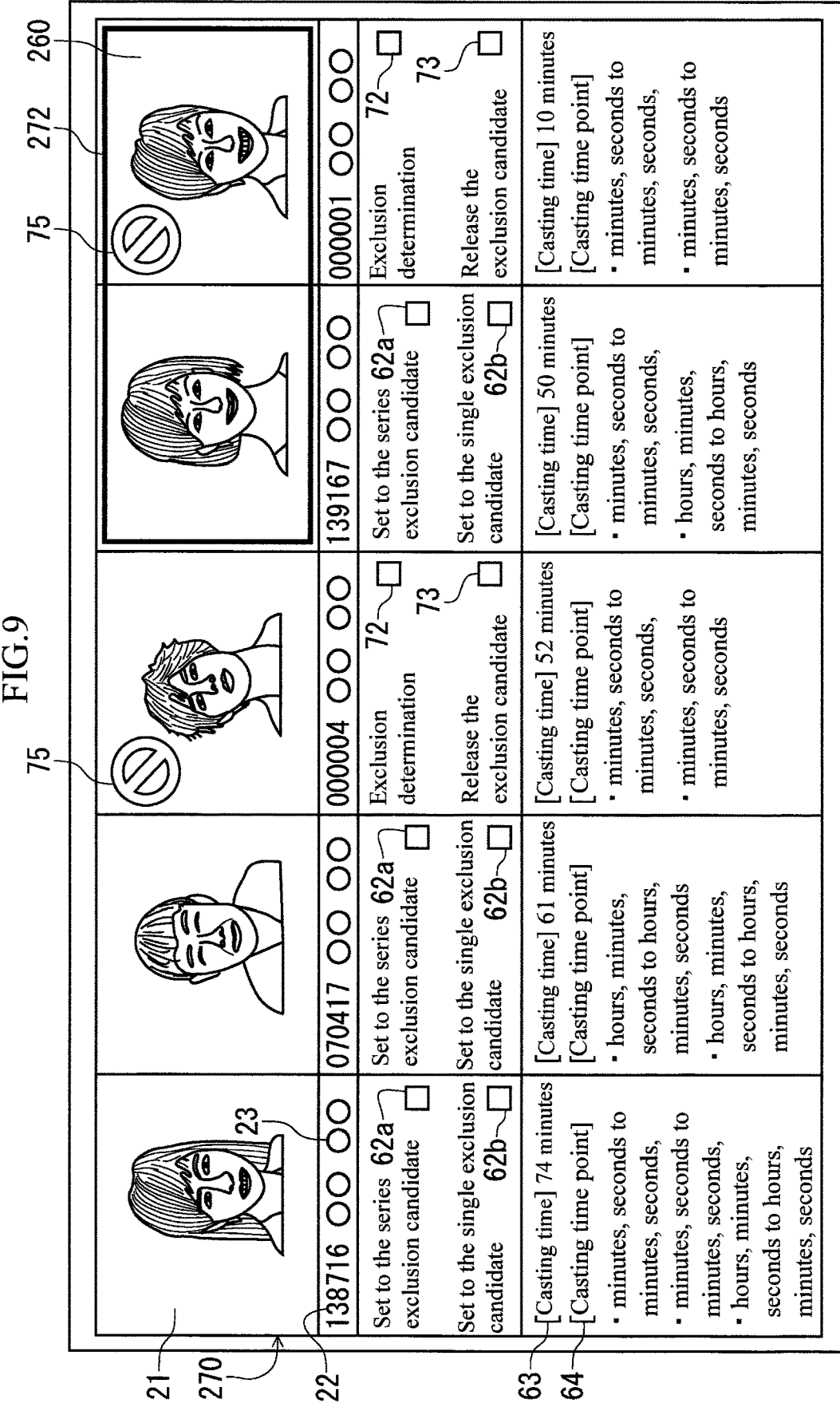
FIG. 9 is an explanatory view illustrating one example of the display mode of a cast checklist in Embodiment 3.

Therefore, as illustrated in FIG. 9, information indicating the abovementioned persons displayed by person information output unit 45, along with analogous person information 260 displayed by analogous person output unit 47, is displayed in cast checklist 270 displayed on display screen 8a.

Note that in the example of FIG. 9, because analogous person information 260 is overlapped with information indicating the person corresponding to characteristic information 21 extracted by correspondence information extraction unit 43, analogous person information 260 may be displayed by analogous person output unit 47, or may be displayed by person information output unit 45.

Moreover, analogous person output unit 47 displays, on display screen 8a of display unit 8, specific sign 272 indicating which persons are analogous persons. In the example of FIG. 9, the bold frame is displayed as specific sign 272 for specifying the analogous persons. The bold frame surrounds characteristic information 21 (face images) of personal ID 22 "139167," as well as characteristic information 21 (face images) of personal ID 22 "000001." This indicates that the person with personal ID 22 "139167" and the person with personal ID 22 "000001" are analogous persons. Moreover, as in Embodiment 1, person information output unit 45 displays, on display screen 8*a*, display prohibitive sign 75 for specifying information indicating the person corresponding to characteristic information 21 set as an exclusion candidate.

Note that the other processes in Step 16 are the same as the process of Step 9 in Embodiment 1.

Moreover, as in Embodiment 1, exclusion candidate setting input accepting unit 62, exclusion determination input accepting unit 72, and exclusion candidate releasing input accepting unit 73 are configured to be provided in cast checklist 270, so as to accept the input of the user. If the user determines that an analogous person (in the example of FIG. 9, the person with personal ID 22 "000001") automatically set as the exclusion candidate is actually cast, the setting of the exclusion candidate can be released via exclusion candidate releasing input accepting unit 73.

As mentioned above, in Embodiment 3, exclusion candidate setting unit 48 sets characteristic information 21 selected in accordance with the predetermined criterion to the exclusion candidate among analogous multiple characteristic information 21 if multiple characteristic information 21 extracted by correspondence information extraction unit 43 is analogous.

Consequently, if the predetermined criterion for selecting a person who may correspond to erroneous extraction is set regarding persons with analogous facial characteristics, a person potentially corresponding to erroneous extraction can be set as an exclusion candidate. Moreover, a person who needs not be included in the disclosed cast information for some reason or other, such as having a short display time (casting time), for example, in addition to erroneous extraction, can be set as an exclusion candidate.

Therefore, more accurate and appropriate disclosed cast information can be created. Moreover, if characteristic information 21 set to the exclusion candidate is selected in accordance with the predetermined criterion, the exclusion candidate can be set more rapidly.

Moreover, exclusion candidate setting unit 48 selects characteristic information 21 corresponding to a person satisfying the predetermined criterion regarding the display time length in moving image data 17 and sets it to the exclusion candidate.

Therefore, taking the display time length into consideration, the exclusion candidate can be set.

Embodiment 4

The configuration of the person information display apparatus according to Embodiment 4 is the same as the configuration of person information display apparatus 100 according to Embodiment 2 illustrated in FIG. 6. Therefore, a description will be provided using the same components and labels as in Embodiment 2.

Moreover, person information display apparatus 100 according to Embodiment 4 executes the same process as the process indicated in the flowchart of FIG. 8 described in Embodiment 3. In Step 16 of Embodiment 3, the mode in which the criteria regarding the display time length are set is described, while in Embodiment 4, the process of Step 16 in which the criteria regarding the close-up degree are set will be described.

Here, the points differing from Embodiments 2 and 3 will mainly be described.

In Step 16 of FIG. 8, exclusion candidate setting unit 48 sets, to the exclusion candidate, characteristic information 21 of a person satisfying the predetermined criterion among persons (analogous persons) corresponding to each of analogous multiple characteristic information 21.

For example, exclusion candidate setting unit 48 selects characteristic information 21 corresponding to a person satisfying the predetermined criterion regarding the close-up degree calculated by close-up degree calculation unit 152 and sets it to the exclusion candidate.

Here, the case using the criterion that "close-up scene total time 163*a* is the shortest among the analogous persons" will be described. Note that because the method for calculating the close-up degree and close-up scene total time 163*a* is mentioned above in Embodiment 2, a description thereof is omitted.

In this case, as in Embodiment 2, if the person with personal ID 22 "000003" and the person with personal ID 22 "587695" exemplified in FIG. 7 are analogous persons, because close-up scene total time 163*a* of the person with personal ID 22 "000003" is shorter than close-up scene total time 163*a* of the person with personal ID 22 "587695," exclusion candidate setting unit 48 selects characteristic information 21 of the person with personal ID 22 "000003," and sets characteristic information 21 of personal ID 22 "000003" to the exclusion candidate.

Note that the predetermined criterion regarding the close-up degree may be any criteria, potentially including, for example, the criterion that "close-up scene total time ratio 163*b* is the predetermined threshold or lower." Moreover, as in Embodiment 3, at the stage of Step 16, analogous person information 60 is not displayed on display screen 8*a* of display unit 8. Therefore, in Embodiment 4, the display exemplified in FIG. 7 is not displayed.

In Step 16, if exclusion candidate setting unit 48 sets characteristic information 21 selected in accordance with the predetermined criterion to the exclusion candidate, cast checklist 270 including the person set as an exclusion candidate is displayed (Step 19). The process in Step 19 is mentioned above in Embodiment 3 and therefore omitted.

Note that as mentioned above, if the person with personal ID 22 "000003" and the person with personal ID 22 "587695" are analogous persons, cast checklist 270 includes the person with personal ID 22 "000003" and the person with personal ID 22 "587695." In this case, information regarding the person with personal ID 22 "000003" and regarding the person with personal ID 22 "587695" is displayed as analogous person information 260, as in information regarding the person with personal ID 22 "139167" and the person with personal ID 22 "000001" displayed in FIG. 9.

Moreover, as in analogous person information 260 displayed in FIG. 9, the bold frame surrounding characteristic information 21 (face images) of personal ID 22 "000003" and characteristic information 21 (face images) of personal ID 22 "587695" is displayed as specific sign 272 for specifying analogous persons.

Moreover, while display time information 63 and display time point information 64 are displayed in cast checklist 270 in the example of the abovementioned FIG. 9, in addition thereto, information 163 based on the close-up degree as exemplified in FIG. 7 may be displayed. Moreover, instead of display time information 63 and display time point information 64, information 163 based on the close-up degree may be displayed. Note that if information 163 based on the close-up degree is displayed in cast checklist 270, close-up degree calculation unit 152 may calculate information 163 based on the close-up degree of each person regarding all persons (all the persons displayed in cast checklist 270) corresponding to characteristic information 21 extracted by correspondence information extraction unit 43 and display it on display screen 8*a*.

As mentioned above, in Embodiment 4, exclusion candidate setting unit 48 selects characteristic information 21 corresponding to a person satisfying the predetermined criterion regarding the close-up degree calculated by close-up degree calculation unit 152 and sets it to the exclusion candidate.

Therefore, taking the close-up degree into consideration, the exclusion candidate can be set.

Embodiment 5

The configuration of the person information display apparatus according to Embodiment 5 is the same as the configuration of person information display apparatus 100 according to Embodiment 2 illustrated in FIG. 6. Therefore, a description will be provided using the same components and labels as in Embodiment 2.

In the abovementioned Embodiments 3 and 4, it has been determined whether there are analogous persons in Step 5, after which in Step 16, regarding the analogous persons, exclusion candidate setting unit 48 sets characteristic information 21 selected in accordance with the predetermined criterion to the exclusion candidate.

Regarding this, in Embodiment 5, the mode will be described in which exclusion candidate setting unit 48 sets characteristic information 21 selected in accordance with the predetermined criterion to the exclusion candidate, after which a determination is made regarding whether there are analogous persons.

Here, the points differing from each of the previously described embodiments will mainly be described.

Figure 10:
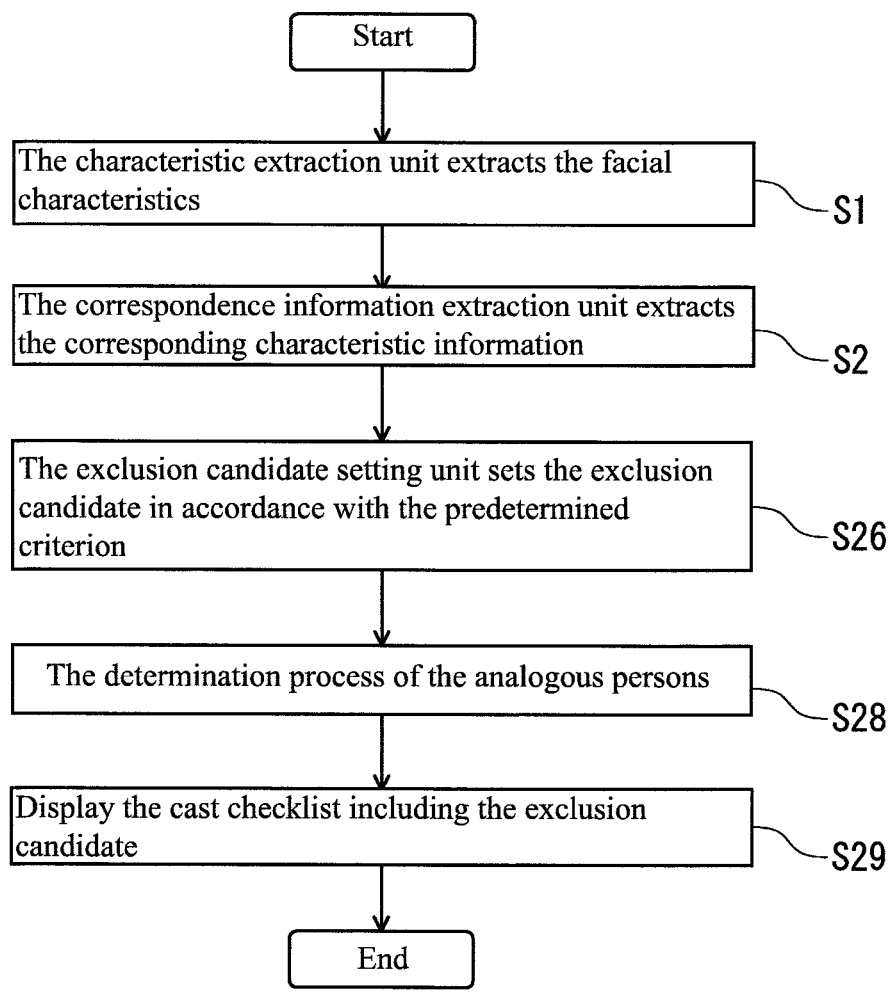
FIG. 10 is a flowchart illustrating the operation of a person information display apparatus according to Embodiment 5.

Person information display apparatus 100 according to Embodiment 5 executes the process illustrated in the flowchart of FIG. 10. Because the processes of Steps 1 and 2 illustrated in FIG. 10 are the same as the processes described in Embodiment 1 with reference to FIG. 3, descriptions thereof are omitted.

In Step 2, if correspondence information extraction unit 43 extracts correspondence characteristic information 21, exclusion candidate setting unit 48 sets, to the exclusion candidate, characteristic information 21 of a person satisfying the predetermined criterion among persons corresponding to each of multiple characteristic information 21 extracted by correspondence information extraction unit 43 (Step 26).

For example, as mentioned above in Embodiment 3, exclusion candidate setting unit 48 may select characteristic information 21 corresponding to a person satisfying the predetermined criterion regarding the display time length in moving image data 17 and set it to the exclusion candidate. Note that because the method for calculating the abovementioned display time length is mentioned above in Embodiment 1, a description thereof is omitted.

As one example, if the criterion that "the display time length is the predetermined length or shorter" is set, exclusion candidate setting unit 48 sets, to the exclusion candidate, characteristic information 21 of a person in which the display time length is the predetermined length or shorter.

Moreover, as another example, as mentioned above in Embodiment 4, exclusion candidate setting unit 48 may select characteristic information 21 corresponding to a person satisfying the predetermined criterion regarding the close-up degree calculated by close-up degree calculation unit 152 and set it to the exclusion candidate. Note that because the method for calculating the close-up degree, as well as the predetermined criterion regarding the close-up degree, is mentioned above in Embodiment 2, a description thereof is omitted.

For example, if the criterion that "close-up scene total time ratio 163*b* is the predetermined threshold or lower" is set, exclusion candidate setting unit 48 sets, to the exclusion candidate, characteristic information 21 of a person in which close-up scene total time ratio 163*b* is the predetermined threshold or lower. In this case, for example, regarding all persons corresponding to characteristic information 21 extracted by correspondence information extraction unit 43, close-up degree calculation unit 152 calculates close-up scene total time ratio 163*b* of each person. Note that because the method for calculating close-up scene total time ratio 163*b* is mentioned above in Embodiment 2, a description thereof is omitted.

In Step 26, if exclusion candidate setting unit 48 sets the exclusion candidate, analogous person determination unit 46 determines whether there are analogous persons in characteristic information 21 extracted in Step 27 (Step 28). Because the determination of the analogous persons by analogous person determination unit 46 is mentioned above in the previously described embodiments, a description thereof is omitted.

Note that in the present embodiment, without excluding characteristic information 21 set to the exclusion candidate, analogous person determination unit 46 determines whether there are analogous persons in characteristic information 21 extracted in Step 27.

In Step 28, as in the processes of Steps 5 to 7 of FIG. 3 described in Embodiments 1 and 2, the process may be executed in which analogous person output unit 47 displays analogous person information 60 on display unit 8 and exclusion candidate setting input accepting unit 62 accepts the input of the user. At this time, if the analogous persons include a person with characteristic information 21 which has been set to the exclusion candidate, analogous person output unit 47 may display, on display unit 8, the abovementioned prohibitive sign 75 with reference to FIGS. 5 and 9, in displayed analogous person information 60. As mentioned above, prohibitive sign 75 is a sign for specifying information indicating a person corresponding to characteristic information 21 set as an exclusion candidate and is assigned to the information indicating a person corresponding to characteristic information 21 set as an exclusion candidate and displayed.

In this case, it may be configured such that in display screen 8*a* of analogous person information 60, exclusion candidate releasing input accepting unit 73 accepts the input of the user, so as to enable the setting of the exclusion candidate to be released.

Moreover, as another example, without displaying analogous person information 60 on display unit 8 in Step 28, the process may proceed to the process of the below-mentioned Step 29.

Note that in the present embodiment, because characteristic information 21 of a person satisfying the predetermined criterion in Step 26 is set to the exclusion candidate, an analogous person satisfying the predetermined criterion is set as an exclusion candidate. Therefore, regarding analogous multiple characteristic information 21 as well, exclusion candidate setting unit 48 sets characteristic information 21 selected in accordance with the predetermined criterion to the exclusion candidate.

Upon completion of the process in Step 28, person information output unit 45 displays, on display unit 8, cast checklists 70, 270 including the person set as an exclusion candidate (Step 29). Because the process in Step 29 is the same process as in Step 9 of FIG. 3 or Step 19 of FIG. 8 as mentioned above in the previously described embodiments, a description thereof is omitted. Note that if analogous person information 60 is not displayed on display unit 8 in Step 28, as illustrated in the example of FIG. 9, specific sign 272 for specifying the analogous persons may be configured to be displayed in cast checklist 270.

As mentioned above, in Embodiment 5, exclusion candidate setting unit 48 sets, to the exclusion candidate, characteristic information 21 of a person satisfying the predetermined criterion among persons corresponding to each of multiple characteristic information 21 extracted by correspondence information extraction unit 43.

Therefore, the setting of the exclusion candidate can be executed more rapidly.

As one example, a person having a considerably short display time length (for example, 10 seconds in moving image data 17 of a two-hour drama, etc.) compared with the length of overall moving image data 17 may be presumably a person of erroneously extracted characteristic information 21. Moreover, even if it is not erroneously extracted, the person may be a person such as an extra who needs not be listed in disclosed cast information. Similarly, a person having considerably short close-up scene total time 163a calculated using the close-up degree compared with others may also be an erroneously extracted person, or a person who needs not be listed in disclosed cast information. Therefore, as the abovementioned predetermined criteria, for example, the exclusion candidate can be set using the criterion regarding the display time length or the close-up degree.

Embodiment 6

The person information display apparatus according to Embodiment 6 is configured such that control units 6, 106 in the previously described embodiments include a non-correspondence characteristic output unit (not illustrated).

The non-correspondence characteristic output unit cuts the images of faces corresponding to the moving image characteristic information not corresponding to characteristic information 21, from moving image data 17 among the facial characteristics (moving image characteristic information) extracted by characteristic extraction unit 42 and displays them on display unit 8.

For example, the non-correspondence characteristic output unit extracts all of the non-correspondence moving image characteristic information from moving image characteristic information storage unit 15, cuts the images of faces corresponding to each moving image characteristic information from moving image data 17, and displays the images of the cut faces on display screen 8a of display unit 8.

As a result, the user can grasp the faces of persons for which correspondence information extraction unit 43 has not extracted correspondence characteristic information 21.

A person corresponding to the abovementioned non-correspondence moving image characteristic information is assumed to be a person not included in characteristic information 21 stored in person information storage unit 12 or a person included in characteristic information 21 for whom correspondence characteristic information 21 not extracted.

If the user determines that the person corresponding to the abovementioned non-correspondence moving image characteristic information is a person not included in stored characteristic information 21, main control unit 41 stores, in person information storage unit 12, the abovementioned image of the cut face as characteristic information 21 of the face of the person, in accordance with the input of the user via input unit 7, and assigns an identifier (personal ID 22) for identifying characteristic information 21. Moreover, main control unit 41 stores, in person information storage unit 12, information regarding the person such as full name 23 input by the user so as to be associated with the abovementioned personal ID 22 and characteristic information 21. That is, a new record is added to person information 20 illustrated in FIG. 2.

In this case, person information output unit 45 may be configured to display information regarding the newly added person in cast checklists 70, 270. That is, person information output unit 45 may be configured to display, on display unit 8, information indicating a person corresponding to the abovementioned image displayed on display unit 8 by the non-correspondence characteristic output unit.

Moreover, if the user determines that person corresponding to the abovementioned non-correspondence moving image characteristic information is a person included in stored characteristic information 21, it may be configured that the user inputs personal ID 22 of the person corresponding to the abovementioned non-correspondence moving image characteristic information via input unit 7, and person information output unit 45 displays information indicating the person of input personal ID 22 in cast checklists 70, 270.

Further, main control unit 41 may be configured to store, in person information storage unit 12, the abovementioned image of the cut face as another characteristic information 21 of the person, in accordance with the input of the user via input unit 7. In this case, multiple characteristic information 21 regarding one person is stored. As a result, for example, if the person displayed in moving image data 17 has special makeup, etc., and pre-stored characteristic information 21 does not correspond to the moving image characteristic information of moving image data 17, the image of the face having the special makeup, etc. can be additionally registered as characteristic information 21 of the person. Therefore, in the process after the additional registration, correspondence information extraction unit 43 can extract characteristic information 21 corresponding to the facial characteristic of the person having the special makeup, etc.

Moreover, the face images of animated characters also can be additionally registered as characteristic information 21 of the voice actors of the characters.

Moreover, if the user inputs, via an input unit, personal ID 22 of a person to which new characteristic information 21 is added upon the additional registration, it may be configured that analogous person determination unit 46 displays information indicating the person of input personal ID 22, along with information indicating a person corresponding to characteristic information analogous to characteristic information of input personal ID 22, as analogous person information 60, 260 on display screen 8a of display unit 8, based on analogous relationship information 36 stored in analogous relationship storage unit 14.

As a result, the user can grasp a person analogous to a person to which new characteristic information 21 is added. Therefore, the user can be reminded not to erroneously associate new characteristic information 21 with an analogous person.

Moreover, personal ID 22 different from personal ID 22 of a person to which new characteristic information 21 is added may be assigned to additionally registered new characteristic information 21, or another identifier associated with personal ID 22 of the person to which new characteristic information 21 is added may be assigned thereto. As a result, each of multiple characteristic information 21 associated with one person can be identified. Moreover, as mentioned above, multiple characteristic information 21 associated with one person may be pre-stored as mutually analogous information in analogous relationship information 36. At this time, as mentioned above with reference to FIG. 2, using an identifier for identifying each characteristic information 21, the analogous relationship of each characteristic information 21 may be stored as analogous relationship information 36 in analogous relationship storage unit 14.

Note that in Embodiment 6, storage unit 5 may be configured to include a non-correspondence characteristic storage unit (not illustrated). In this case, the non-correspondence characteristic output unit stores the image of the cut face in the non-correspondence characteristic storage unit. Upon carrying out the operation of associating the image of the cut face with information indicating the person such as full name 23 by the user, main control unit 41 reads the image of the face from the non-correspondence characteristic storage unit and displays it on display screen 8*a* of display unit 8.

Moreover, instead of storing the image of the cut face as characteristic information 21 in person information storage unit 12, other images indicating the person of the image of the cut face may be prepared and stored as characteristic information 21 in person information storage unit 12.

Moreover, upon storing new characteristic information 21 in person information storage unit 12, characteristic information 21 may be designated by the abovementioned extraction object designation unit 44, and new characteristic information 21 may be set so as to serve as the extraction object only in moving image data 17 of the specific series.

Other Embodiments

While embodiments of the present invention have been mentioned above, the present invention is not limited to the previously described embodiments, with various variations and changes possible.

For example, in the previously described embodiments, while person information output unit 45 differentiates the display mode of the information indicating the person corresponding to characteristic information 21 set as an exclusion candidate by exclusion candidate setting unit 48, from the display mode of the information indicating the person corresponding to characteristic information 21 not set as an exclusion candidate, and displays it on display unit 8, the information may be configured to be displayed on display unit 8 in the same display mode.

Moreover, in the example of FIGS. 5 and 9, while information indicating the person corresponding to characteristic information 21 set as an exclusion candidate by exclusion candidate setting unit 48, along with information indicating the person corresponding to characteristic information 21 not set as an exclusion candidate, is displayed on the same screen, it may be configured such that the information is segmented and displayed on each individual screen.

In the previously described embodiments, by displaying prohibitive sign 75 for specifying information indicating the person corresponding to characteristic information 21 set as an exclusion candidate, the display mode of the person set as an exclusion candidate is differentiated from that of the person not set as an exclusion candidate, with the display mode capable of being differentiated by any method.

For example, the face image of the person corresponding to characteristic information 21 set as an exclusion candidate may be displayed in black and white, or the face image of the person corresponding to characteristic information 21 not set as an exclusion candidate may be displayed in color.

Moreover, character information such as "is cast" may be displayed in information indicating the person corresponding to characteristic information 21 not set as an exclusion candidate, while character information such as "exclusion candidate" may be displayed in information indicating the person corresponding to characteristic information 21 which has been set as an exclusion candidate.

Moreover, information indicating the person corresponding to characteristic information 21 set as an exclusion candidate, along with information indicating the person corresponding to characteristic information 21 not set as an exclusion candidate, may be displayed in each independent window, and signs, characters, etc. for specifying the information indicating the person corresponding to characteristic information 21 set as an exclusion candidate may be displayed in the same window as information indicating the person corresponding to characteristic information 21 set as an exclusion candidate.

As mentioned above, any display mode may be employed in which the user can distinguish the information indicating the person corresponding to characteristic information 21 set as an exclusion candidate, from the information indicating the person corresponding to characteristic information 21 not set as an exclusion candidate, and visually confirm them.

Moreover, each process as mentioned above in the previously described embodiments may be combined and executed.

For example, each of the abovementioned processes may be executed using both the predetermined criterion regarding the close-up degree and the predetermined criterion regarding the display time length in moving image data 17. In this case, for example, characteristic information of a person satisfying both the predetermined criterion regarding the close-up degree and the predetermined criterion regarding the display time length may be set to the exclusion candidate.

Moreover, in analogous person information 60, 260 or cast checklists 70, 270 in the previously described embodiments, information 163 based on the close-up degree, display time information 63, and display time point information 64 may be displayed on display screen 8*a*.

Moreover, while the process using the predetermined criterion regarding the close-up degree, as well as the process using the predetermined criterion regarding the display time length, has been described in the previously described embodiments, any criteria may be used. For example, other predetermined criteria regardless of the close-up degree or display time may be used.

Moreover, as methods for determining the similarity of characteristic information 21, methods other than the previously described determination method may be employed.

While analogous relationship information 36 is pre-created and stored in analogous relationship storage unit 14 in the previously described embodiments, methods involving not pre-creating analogous relationship information 36 may be employed. In this case, for example, analogous person determination unit 46 may be configured to determine, by image matching, whether each of multiple characteristic information 21 extracted by correspondence information extraction unit 43 is mutually analogous.

In the previously described embodiments, if correspondence information extraction unit 43 extracts multiple characteristic information 21 as characteristic information 21 corresponding to one facial characteristic, extracted multiple characteristic information 21 may be stored in analogous relationship information 36 as mutually analogous information. In this case, main control unit 41 may be configured to store the analogous relationship of the abovementioned extracted multiple characteristic information 21 as analogous relationship information 36 in analogous relationship storage unit 14. At this time, as mentioned above with reference to FIG. 2, using an identifier for identifying each characteristic information 21, the analogous relationship of each characteristic information 21 may be stored as analogous relationship information 36 in analogous relationship storage unit 14.

As a result, analogous person determination unit 46 can determine that multiple characteristic information 21 extracted as characteristic information 21 corresponding to one facial characteristic in the process of a certain moving image data 17 are analogous in the process of other moving image data 17.

While analogous person output unit 47 displays analogous person information 60, 260 on display unit 8 in the previously described embodiments, a configuration in which analogous person information 60, 260 is not displayed on display unit 8 without providing analogous person output unit 47 may be employed.

While two persons are indicated as analogous persons in the example of FIGS. 4 and 7, analogous person information 60 indicating two or more persons may be displayed. As one example, information indicating the person corresponding to characteristic information 21 analogous to at least one characteristic information 21 may be displayed as analogous person information 60. In this case, for example, information indicating three persons may be displayed as analogous person information 60, the three persons including person B corresponding to characteristic information 21 analogous to characteristic information 21 of person A, person C corresponding to characteristic information 21 analogous to characteristic information 21 of person A, and person A.

In Embodiment 1, if multiple characteristic information 21 corresponding to one piece of moving image characteristic information (the facial characteristic of one person) is extracted, and information indicating the persons corresponding to extracted multiple characteristic information 21 is displayed as analogous person information 60, main control unit 41 may display a message reminding the user on display unit 8. This is because, as mentioned above, in the abovementioned case, multiple characteristic information 21 may include erroneously extracted characteristic information 21.

In Embodiment 1, a person in which the display time length ratio of each person to the total display time length in moving image data 17 of the analogous persons is 30% or higher may not be erroneously extracted. Therefore, if there are multiple persons specified such that the display time length ratio is 30% or higher among analogous persons, multiple persons having analogous facial characteristics may be presumably cast in the moving image. Consequently, if there are multiple persons specified such that the display time length ratio is 30% or higher among analogous persons, main control unit 41 may display a message reminding the user on display unit 8.

For example, in the previously described embodiments, a predetermined number of key frames regarding each person may be extracted in descending order of the close-up degree and close-up degree calculation unit 152 may calculate the average value of the close-up degree of the predetermined number of extracted key frames, then display it as information 163 regarding the close-up degree on display unit 8. Moreover, the predetermined criterion regarding the close-up degree may be set to a criterion using the average value.

Moreover, as another example, close-up degree calculation unit 152 may calculate the display time length of consecutive key frames having the predetermined threshold or higher of the close-up degree and display it as information 163 regarding the close-up degree on display unit 8. Moreover, the predetermined criterion regarding the close-up degree may be set to a criterion using the display time length of the consecutive key frames. The display time length of the consecutive key frames indicates the length of time in which the close-up state of the face of the person is consecutively displayed.

In the previously described embodiments, moving image data 17 serving as the object of the process may be any moving image data. For example, it may be moving image data 17 of VOD or moving image data 17 other than VOD.

Moreover, in the previously described embodiments, while moving image data 17a for series-configuring moving images is the object of the process, moving image data 17 of a single moving image not serving as a series may be the object.

In Embodiment 1, while time information calculation unit 51 calculates display time information 63 and displays it on calculate display unit 8, a configuration in which display time information 63 is not displayed on display unit 8 may be employed without providing time information calculation unit 51. Moreover, without providing the abovementioned extraction object designation unit 44 or non-correspondence characteristic output unit, person information display apparatuses 1, 100 may be configured.

In the previously described embodiments, data extracted, calculated created, etc. by each process may be stored in storage unit 5 and appropriately read from storage unit 5 and used. For example, it may be configured such that correspondence information extraction unit 43 stores, in storage unit 5, characteristic information 21 extracted by correspondence information extraction unit 43, wherein each function unit included in control unit 6 reads, from storage unit 5, characteristic information 21 extracted by correspondence information extraction unit 43, and uses it.

Moreover, in the previously described embodiments, a configuration in which exclusion determination is not set without providing exclusion determination setting unit 49 may be employed. For example, if the setting of the exclusion candidate has not been released in cast checklists 70, 270, the person corresponding to characteristic information 21 which has been set as an exclusion candidate may be configured to be excluded from disclosed cast information (not illustrated). In this case, information indicating the person set as an exclusion candidate is excluded from the disclosed cast information and not disclosed.

Moreover, it may be configured such that if exclusion determination setting unit 49 sets, to exclusion determination, a person selected in accordance with the input of the user among the persons set as exclusion candidates, an input screen for accepting the input of the user is displayed and the user is made to select whether the setting of exclusion determination is only applied to moving image data (moving image data 17a for series-configuring moving images) corresponding to cast checklists 70, 270, or applied to all of the moving image data (moving image data 17*a* for series-configuring moving images) of the same series as the moving image data.

For example, if it is selected by the input of the user that the setting of exclusion determination is only applied to moving image data 17*a* corresponding to cast checklists 70, 270, the setting of exclusion determination is released upon processing next moving image data 17*a*, with characteristic information 21 of a person with the setting of exclusion determination released serving as the extraction object of correspondence information extraction unit 43.

Moreover, if it is selected by the input of the user that the setting of exclusion determination is applied to all of moving image data 17*a* of the same series, characteristic information 21 of a person set to exclusion determination may be configured to be excluded from the extraction object of correspondence information extraction unit 43, in the process of other moving image data 17*a* configuring the same series.

In Embodiment 5, prior to the process of Step 28 of FIG. 10, it may be configured to execute Step 27 (not illustrated) in which main control unit 41 extracts characteristic information 21 other than the exclusion candidate from characteristic information 21 extracted by correspondence information extraction unit 43. In this case, characteristic information 21 satisfying the predetermined criterion used in Step 26 has already been set to the exclusion candidate and excluded from the extraction object of the analogous persons in the abovementioned Step 27. Therefore, in Step 28, a predetermined criterion different from those of Step 26 is used.

While face images are used as characteristic information 21 in the previously described embodiments, information other than the face images may be used. For example, information of the characteristic points extracted from the face images may be pre-stored as characteristic information 21 in person information storage unit 12.

The face images used as characteristic information 21 or for creating characteristic information 21 may be face images of any persons, including, for example, persons who may be cast in TV programs or video works, such as actors, actresses, TV personalities, entertainers, artists, and celebrities.

Moreover, regarding moving image data of animation, in order to create the disclosed cast information of voice actors, the face images of animated characters may be stored as characteristic information 21 of voice actors of the characters in person information storage unit 12.

Moreover, if recorded moving images of the specific group, private moving images with families, friends, etc., or the like are the objects of the process, the face images of members of the group, families, friends, etc. may be stored as characteristic information 21 in person information storage unit 12.

Person information 20 may include any information. For example, the voice of each person may be stored in person information storage unit 12 so as to be associated with characteristic information 21 of each person. In this case, it may be configured that the voice is extracted from the moving image data and compared with the voice of each person stored in person information storage unit 12, so as to improve the precision specific to the persons.

The disclosed cast information may include any information. For example, in addition to the previously described information, a character name, etc. associated with full name 23, etc. may be included in the disclosed cast information.

Each of the abovementioned function units configuring person information display apparatuses 1, 100 may be provided in a simplex computer or may be dispersed and provided in multiple computers communicable via a communication network.

For example, moving image storage unit 11, person information storage unit 12, and analogous relationship storage unit 14 may be provided in a computer functioning as a server, while moving image characteristic information storage unit 15, as well as each function unit included in control units 6, 106, may be provided in a terminal computer communicable with the server. Moreover, various information may be configured to be displayed on display unit 8 of the terminal computer communicable with the server.

Note that moreover, in the previously described embodiments, "associated" includes the case in which each data is directly or indirectly related or linked.

For example, various processes may be executed by recording a program for achieving the function of person information display apparatuses 1, 100 in a computer readable recording medium, and reading and executing the program recorded in this recording medium in a computer system. Note that the "computer system" used herein includes hardware such as OS and peripheral equipment.

Moreover, the "computer system" includes a homepage providing environment (or display environment) if it utilizes a WWW system.

Moreover, the "computer readable recording medium" is a portable medium such as a flexible disk, magneto-optical disk, ROM, CD-ROM, or DVD, as well as storage apparatuses such as a hard disk integrated in the computer system. The "computer readable recording medium" further includes: a medium for dynamically holding the program for a short period of time, such as a communication line in the case of transmitting the program via a network such as the Internet along with a communication circuit such as a telephone circuit; and a medium for holding the program for a certain period of time, such as a volatile memory inside the computer system serving as a server and client. Moreover, the program may be provided to achieve a portion of the function, or further the function may be achieved in combination with a program already recorded in the computer system.

Regarding the previously described embodiments, the following appendices will be further disclosed.

Appendix 1

A person information display apparatus comprising:

a characteristic extraction unit for extracting facial characteristics of persons from moving image data;

a correspondence information extraction unit for extracting characteristic information corresponding to the facial characteristics extracted by the characteristic extraction unit from pre-stored characteristic information on faces of multiple persons;

an exclusion candidate setting unit for setting, to an exclusion candidate, the characteristic information selected in accordance with an input of a user or a predetermined criterion among analogous characteristic information if multiple characteristic information extracted by the correspondence information extraction unit is analogous; and a person information output unit for displaying, on the display unit, information indicating a person corresponding to the characteristic information extracted by the correspondence information extraction unit and set to the exclusion candidate by the exclusion candidate setting unit, as well as information indicating a person corresponding to the characteristic information extracted by the correspondence information extraction unit and not set to the exclusion candidate.

Appendix 2

The person information display apparatus according to Appendix 1, wherein the person information output unit differentiates a display mode of information indicating a person corresponding to the characteristic information extracted by the correspondence information extraction unit and set to the exclusion candidate by the exclusion candidate setting unit, from a display mode of information indicating a person corresponding to the characteristic information extracted by the correspondence information extraction unit and not set to the exclusion candidate, and displays it on the display unit.

Appendix 3

The person information display apparatus according to Appendix 1 or 2, wherein, if the exclusion candidate setting unit sets the characteristic information to the exclusion candidate in at least one of a plurality of the moving image data configuring a same series, the characteristic information set to the exclusion candidate is excluded from the characteristic information extracted by the correspondence information extraction unit in other moving image data configuring the same series.

Appendix 4

The person information display apparatus according to any one of Appendices 1 to 3, further comprising: an analogous person determination unit for determining whether the multiple characteristic information extracted by the correspondence information extraction unit is analogous, based on pre-stored analogous relationship information indicating analogous persons, wherein
the exclusion candidate setting unit sets, to the exclusion candidate, the characteristic information selected in accordance with an input of a user or a pre-set predetermined criterion among the multiple characteristic information which has been determined to be analogous by the analogous person determination unit.

Appendix 5

The person information display apparatus according to any one of Appendices 1 to 4, further comprising: an analogous person determination unit for determining that the multiple characteristic information extracted by the correspondence information extraction unit is analogous if the correspondence information extraction unit extracts the multiple characteristic information as the characteristic information corresponding to one facial characteristic, wherein
the exclusion candidate setting unit sets, to the exclusion candidate, the characteristic information selected in accordance with an input of a user or a pre-set predetermined criterion among the multiple characteristic information which has been determined to be analogous by the analogous person determination unit.

Appendix 6

The person information display apparatus according to any one of Appendices 1 to 5, further comprising: an analogous person output unit for displaying, on the display unit, information indicating a person corresponding to each of the analogous multiple characteristic information as analogous person information if the multiple characteristic information extracted by the correspondence information extraction unit is analogous, wherein
the exclusion candidate setting unit sets, to the exclusion candidate, the characteristic information selected in accordance with an input of a user or a pre-set predetermined criterion among the characteristic information corresponding to the analogous person information displayed by the analogous person output unit.

Appendix 7

The person information display apparatus according to Appendix 6, further comprising: a time information calculation unit for calculating display time information indicating a display time length of each person in the moving image data, regarding multiple persons indicated by the analogous person information, and displaying the display time information on the display unit.

Appendix 8

The person information display apparatus according to any one of Appendices 1 to 7, further comprising: an analogous person output unit for displaying, on the display unit, information indicating a person corresponding to each of the analogous multiple characteristic information as analogous person information if the multiple characteristic information extracted by the correspondence information extraction unit is analogous, wherein
the analogous person output unit displays, on the display unit, information for specifying a person satisfying a pre-determined criterion regarding a display time length in the moving image data among the multiple persons indicated by the analogous person information.

Appendix 9

The person information display apparatus according to any one of Appendices 1 to 8, further comprising: a close-up degree calculation unit for calculating a close-up degree serving as a ratio of an area of a face of the person in a frame of the moving image data, and displaying, on the display unit, information based on the calculated close-up degree.

Appendix 10

The person information display apparatus according to Appendix 9, further comprising: an analogous person output unit for displaying, on the display unit, information indicating a person corresponding to each of the analogous multiple characteristic information as analogous person information if the multiple characteristic information extracted by the correspondence information extraction unit is analogous, wherein
the analogous person output unit displays, on the display unit, information for specifying a person satisfying a pre-determined criterion regarding the close-up degree calculated by close-up degree calculation unit among the multiple persons indicated by the analogous person information.

Appendix 11

The person information display apparatus according to any one of Appendices 1 to 10, wherein the exclusion candidate setting unit selects the characteristic information corresponding to a person satisfying a predetermined criterion regarding a display time length in the moving image data, and sets the characteristic information to the exclusion candidate.

Appendix 12

The person information display apparatus according to any one of Appendices 1 to 11, further comprising: a close-up degree calculation unit for calculating a close-up degree serving as a ratio of an area of a face of the person in a frame of the moving image data, wherein the exclusion candidate setting unit selects the characteristic information corresponding to a person satisfying a predetermined criterion regarding the close-up degree calculated by the close-up degree calculation unit, and sets the characteristic information to the exclusion candidate.

Appendix 13

The person information display apparatus according to any one of Appendices 1 to 12, further comprising: a close-up degree calculation unit for calculating a close-up degree serving as a ratio of an area of a face of the person in a frame of the moving image data, wherein the person information output unit displays, on the display unit, information indicating a person corresponding to the characteristic information extracted by the correspondence information extraction unit, in the sequence based on the close-up degree calculated by the close-up degree calculation unit.

Appendix 14

The person information display apparatus according to any one of Appendices 1 to 13, further comprising: a close-up degree calculation unit for calculating a close-up degree serving as a ratio of an area of a face of the person in a frame of the moving image data, wherein the person information output unit displays, on the display unit, information indicating a person corresponding to the characteristic information extracted by the correspondence information extraction unit, in the sequence based on a display time length and the close-up degree of the person in the moving image data.

Appendix 15

The person information display apparatus according to any one of Appendices 1 to 14, further comprising: a non-correspondence characteristic output unit for cutting, from the moving image data, an image of a face corresponding to the facial characteristic not corresponding to the characteristic information among the facial characteristics extracted by the characteristic extraction unit, and displaying the image of the face on the display unit.

Appendix 16

The person information display apparatus according to any one of Appendices 1 to 15, further comprising: an extraction object designation unit for designating the characteristic information serving as an extraction object regarding a plurality of the moving image data configuring a specific series, wherein, if the extraction object designation unit designates the characteristic information serving as the extraction object, the characteristic information designated by the extraction object designation unit is excluded from the characteristic information extracted by the correspondence information extraction unit, in the moving image data other than a plurality of the moving image data configuring the specific series.

Appendix 17

A person information display method in a person information display apparatus for displaying information of a person, comprising:

a characteristic extraction step, wherein a characteristic extraction unit of the person information display apparatus extracts facial characteristics of persons from moving image data;

a correspondence information extraction step, wherein a correspondence information extraction unit of the person information display apparatus extracts characteristic information corresponding to the facial characteristics extracted by the characteristic extraction unit from pre-stored characteristic information on faces of multiple persons;

an exclusion candidate setting step, wherein, if the multiple characteristic information extracted by the correspondence information extraction unit is analogous, an exclusion candidate setting unit of the person information display apparatus sets, to an exclusion candidate, the characteristic information selected in accordance with an input of a user or a predetermined criterion among analogous multiple characteristic information; and a person information output step, wherein a person information output unit of the person information display apparatus displays, on the display unit, information indicating a person corresponding to the characteristic information extracted by the correspondence information extraction unit and set to the exclusion candidate by the exclusion candidate setting unit, as well as information indicating a person corresponding to the characteristic information extracted by the correspondence information extraction unit and not set to the exclusion candidate.

Appendix 18

A person information display program in a person information display apparatus for displaying information of a person, wherein the following steps are executed in the person information display apparatus:

a characteristic extraction step, wherein a characteristic extraction unit of the person information display apparatus extracts facial characteristics of persons from moving image data;

a correspondence information extraction step, wherein a correspondence information extraction unit of the person information display apparatus extracts characteristic information corresponding to the facial characteristics extracted by the characteristic extraction unit from pre-stored characteristic information on faces of multiple persons;

an exclusion candidate setting step, wherein, if the multiple characteristic information extracted by the correspondence information extraction unit is analogous, an exclusion candidate setting unit of the person information display apparatus sets, to an exclusion candidate, the characteristic information selected in accordance with an input of a user or a predetermined criterion among analogous multiple characteristic information; and a person information output step, wherein a person information output unit of the person information display apparatus displays, on the display unit, information indicating a person corresponding to the characteristic information extracted by the correspondence information extraction unit and set to the exclusion candidate by the exclusion candidate setting unit, as well as information indicating a person corresponding to the characteristic information extracted by the correspondence information extraction unit and not set to the exclusion candidate.

EXPLANATION OF THE SYMBOLS 1, 100 person information display apparatuses
8 display unit
17 moving image data
17a moving image data for series-configuring moving images
21 characteristic information
36 analogous relationship information
42 characteristic extraction unit
43 correspondence information extraction unit
44 extraction object designation unit
45 person information output unit
46 analogous person determination unit
47 analogous person output unit
48 exclusion candidate setting unit
51 time information calculation unit
152 close-up degree calculation unit

The invention claimed is:

1. A person information display apparatus for displaying information of a person in order to create cast information serving as information regarding a person displayed in moving image data, comprising:
a characteristic extraction unit for extracting facial characteristics of persons from the moving image data;
a correspondence information extraction unit for extracting characteristic information corresponding to the facial characteristics extracted by the characteristic extraction unit from pre-stored characteristic information on faces of multiple persons;
an exclusion candidate setting unit for setting, to an exclusion candidate serving as a candidate of a person excluded from the cast information, the characteristic information selected in accordance with an input of a user or a predetermined criterion among mutually analogous characteristic information if there is the mutually analogous characteristic information among the multiple characteristic information extracted by the correspondence information extraction unit; and
a person information output unit for displaying, on a display unit, information indicating a person corresponding to the characteristic information extracted by the correspondence information extraction unit and set to the exclusion candidate by the exclusion candidate setting unit, as well as information indicating a person corresponding to the characteristic information extracted by the correspondence information extraction unit and not set to the exclusion candidate, wherein
the person information output unit differentiates a display mode of information indicating a person corresponding to the characteristic information extracted by the correspondence information extraction unit and set to the exclusion candidate by the exclusion candidate setting unit, from a display mode of information indicating a person corresponding to the characteristic information extracted by the correspondence information extraction unit and not set to the exclusion candidate, and displays it on the display unit.

2. The person information display apparatus according to claim 1, wherein, if the exclusion candidate setting unit sets the characteristic information to the exclusion candidate in at least one of a plurality of the moving image data configuring a same series, the characteristic information set to the exclusion candidate is excluded from the characteristic information extracted by the correspondence information extraction unit in other moving image data configuring the same series.

3. The person information display apparatus according to claim 1, further comprising: an analogous person determination unit for determining whether there is mutually analogous characteristic information among the multiple characteristic information extracted by the correspondence information extraction unit, based on pre-stored analogous relationship information indicating mutually analogous persons, wherein,
if the analogous person determination unit determines that there is mutually analogous characteristic information, the exclusion candidate setting unit sets, to the exclusion candidate, the characteristic information selected in accordance with an input of a user or a pre-set predetermined criterion among the mutually analogous characteristic information.

4. The person information display apparatus according to claim 1, further comprising: an analogous person determination unit for determining that the multiple characteristic information extracted by the correspondence information extraction unit is mutually analogous if the correspondence information extraction unit extracts the multiple characteristic information as the characteristic information corresponding to one facial characteristic, wherein
the exclusion candidate setting unit sets, to the exclusion candidate, the characteristic information selected in accordance with an input of a user or a pre-set predetermined criterion among the multiple characteristic information which has been determined to be mutually analogous by the analogous person determination unit.

5. The person information display apparatus according to claim 1, further comprising: an analogous person output unit for displaying, on the display unit, information indicating a person corresponding to each of mutually analogous characteristic information as analogous person information if there is the mutually analogous characteristic information among the multiple characteristic information extracted by the correspondence information extraction unit, wherein
the exclusion candidate setting unit sets, to the exclusion candidate, the characteristic information selected in accordance with an input of a user or a pre-set predetermined criterion among the characteristic information corresponding to the analogous person information displayed by the analogous person output unit.

6. The person information display apparatus according to claim 5, further comprising: a time information calculation unit for calculating display time information indicating a display time length of each person in the moving image data, regarding multiple persons indicated by the analogous person information, and displaying the display time information on the display unit.

7. The person information display apparatus according to claim 1, further comprising: an analogous person output unit for displaying, on the display unit, information indicating a person corresponding to each of mutually analogous characteristic information as analogous person information if there is the mutually analogous characteristic information among the multiple characteristic information extracted by the correspondence information extraction unit, wherein
    the analogous person output unit displays, on the display unit, information for specifying a person satisfying a predetermined criterion regarding a display time length in the moving image data among the multiple persons indicated by the analogous person information.

8. The person information display apparatus according to claim 1, further comprising: a close-up degree calculation unit for calculating a close-up degree serving as a ratio of an area of a face of the person in a frame of the moving image data, and displaying, on the display unit, information based on the calculated close-up degree.

9. The person information display apparatus according to claim 8, further comprising: an analogous person output unit for displaying, on the display unit, information indicating a person corresponding to each of mutually analogous characteristic information as analogous person information if there is the mutually analogous characteristic information among the multiple characteristic information extracted by the correspondence information extraction unit, wherein
    the analogous person output unit displays, on the display unit, information for specifying a person satisfying a predetermined criterion regarding the close-up degree calculated by close-up degree calculation unit among the multiple persons indicated by the analogous person information.

10. The person information display apparatus according to claim 1, wherein the exclusion candidate setting unit selects the characteristic information corresponding to a person satisfying a predetermined criterion regarding a display time length in the moving image data, and sets the characteristic information to the exclusion candidate.

11. The person information display apparatus according to claim 1, further comprising: a close-up degree calculation unit for calculating a close-up degree serving as a ratio of an area of a face of the person in a frame of the moving image data, wherein
    the exclusion candidate setting unit selects the characteristic information corresponding to a person satisfying a predetermined criterion regarding the close-up degree calculated by the close-up degree calculation unit, and sets the characteristic information to the exclusion candidate.

12. The person information display apparatus according to claim 1, further comprising: a close-up degree calculation unit for calculating a close-up degree serving as a ratio of an area of a face of the person in a frame of the moving image data, wherein
    the person information output unit displays, on the display unit, information indicating a person corresponding to the characteristic information extracted by the correspondence information extraction unit, in the sequence based on the close-up degree calculated by the close-up degree calculation unit.

13. The person information display apparatus according to claim 1, further comprising: a close-up degree calculation unit for calculating a close-up degree serving as a ratio of an area of a face of the person in a frame of the moving image data, wherein
    the person information output unit displays, on the display unit, information indicating a person corresponding to the characteristic information extracted by the correspondence information extraction unit, in the sequence based on a display time length and the close-up degree of the person in the moving image data.

14. The person information display apparatus according to claim 1, further comprising: a non-correspondence characteristic output unit for cutting, from the moving image data, an image of a face corresponding to the facial characteristic not corresponding to the characteristic information among the facial characteristics extracted by the characteristic extraction unit, and displaying the image of the face on the display unit.

15. The person information display apparatus according to claim 1, further comprising: an extraction object designation unit for designating the characteristic information serving as an extraction object regarding a plurality of the moving image data configuring a specific series, wherein,
    if the extraction object designation unit designates the characteristic information serving as the extraction object, the characteristic information designated by the extraction object designation unit is excluded from the characteristic information extracted by the correspondence information extraction unit, in the moving image data other than a plurality of the moving image data configuring the specific series.

16. A person information display method in a person information display apparatus for displaying the information of a person in order to create cast information serving as information regarding a person displayed in moving image data, comprising:
    a characteristic extraction step, wherein a characteristic extraction unit of the person information display apparatus extracts facial characteristics of persons from the moving image data;
    a correspondence information extraction step, wherein a correspondence information extraction unit of the person information display apparatus extracts characteristic information corresponding to the facial characteristics extracted by the characteristic extraction unit from pre-stored characteristic information on faces of multiple persons;
    an exclusion candidate setting step, wherein, if there is mutually analogous characteristic information among the multiple characteristic information extracted by the correspondence information extraction unit, an exclusion candidate setting unit of the person information display apparatus sets the characteristic information selected in accordance with an input of a user or a predetermined criterion among the mutually analogous characteristic information, to an exclusion candidate serving as a candidate of a person excluded from the cast information; and
    a person information output step, wherein a person information output unit of the person information display apparatus displays, on a display unit, information indicating a person corresponding to the characteristic information extracted by the correspondence information extraction unit and set to the exclusion candidate by the exclusion candidate setting unit, as well as information indicating a person corresponding to the characteristic information extracted by the correspondence information extraction unit and not set to the exclusion candidate, wherein
    in the person information output step, the person information output unit differentiates a display mode of information indicating a person corresponding to the characteristic information extracted by the correspondence information extraction unit and set to the exclusion candidate by the exclusion candidate setting unit, from a display mode of information indicating a person corresponding to the characteristic information extracted by the correspondence information extraction unit and not set to the exclusion candidate, and displays it on the display unit.

17. A non-transitory computer readable medium in a person information display apparatus for displaying the information of a person in order to create cast information serving as information regarding a person displayed in moving image data, wherein the non-transitory computer readable medium includes instructions that cause the following steps to be executed in the person information display apparatus:
- a characteristic extraction step, wherein a characteristic extraction unit of the person information display apparatus extracts facial characteristics of persons from the moving image data;
- a correspondence information extraction step, wherein a correspondence information extraction unit of the person information display apparatus extracts characteristic information corresponding to the facial characteristics extracted by the characteristic extraction unit from pre-stored characteristic information on faces of multiple persons;
- an exclusion candidate setting step, wherein, if there is mutually analogous characteristic information among the multiple characteristic information extracted by the correspondence information extraction unit, an exclusion candidate setting unit of the person information display apparatus sets the characteristic information selected in accordance with an input of a user or a predetermined criterion among the mutually analogous characteristic information, to an exclusion candidate serving as a candidate of a person excluded from the cast information; and
- a person information output step, wherein a person information output unit of the person information display apparatus displays, on a display unit, information indicating a person corresponding to the characteristic information extracted by the correspondence information extraction unit and set to the exclusion candidate by the exclusion candidate setting unit, as well as information indicating a person corresponding to the characteristic information extracted by the correspondence information extraction unit and not set to the exclusion candidate, wherein
- in the person information output step, the person information output unit differentiates a display mode of information indicating a person corresponding to the characteristic information extracted by the correspondence information extraction unit and set to the exclusion candidate by the exclusion candidate setting unit, from a display mode of information indicating a person corresponding to the characteristic information extracted by the correspondence information extraction unit and not set to the exclusion candidate, and displays it on the display unit.

* * * * *